US012802898B2

(12) United States Patent
Günther

(10) Patent No.: US 12,802,898 B2
(45) Date of Patent: Nov. 17, 2026

(54) LID ASSEMBLY FOR AN ENERGY STORAGE CELL, KIT-OF-PARTS AND ENERGY STORAGE CELL COMPRISING THE LID ASSEMBLY

(71) Applicant: SKELETON TECHNOLOGIES GMBH, Großröhrsdorf (DE)

(72) Inventor: Max Günther, Großröhrsdorf (DE)

(73) Assignee: SKELETON TECHNOLOGIES GMBH, Großröhrsdorf (DE)

( * ) Notice: Subject to any disclaimer, the term of this patent is extended or adjusted under 35 U.S.C. 154(b) by 409 days.

(21) Appl. No.: 18/527,608

(22) Filed: Dec. 4, 2023

(65) Prior Publication Data

US 2024/0186076 A1 Jun. 6, 2024

(30) Foreign Application Priority Data

Dec. 6, 2022 (DE) ......................... 102022132404.4

(51) Int. Cl.
*H01G 11/80* (2013.01)

(52) U.S. Cl.
CPC .................................... *H01G 11/80* (2013.01)

(58) Field of Classification Search
CPC ......... H01G 11/14; H01G 11/18; H01G 11/80
See application file for complete search history.

(56) References Cited

U.S. PATENT DOCUMENTS 2,055,645 A * 9/1936 Allen .................. H01M 50/627
429/89
6,282,081 B1 8/2001 Takabayashi et al.
7,987,593 B1 8/2011 Gorst et al.
2002/0105776 A1* 8/2002 Komatsuki ............ H01G 11/04
361/518
2006/0203428 A1* 9/2006 Lobo .................... H01G 13/003
361/315
2016/0343997 A1 11/2016 Sekiya et al.
2019/0259548 A1 8/2019 Hansen
(Continued)

FOREIGN PATENT DOCUMENTS

| | | | |
|---|---|---|---|
| DE | 1105065 | B | 4/1961 |
| DE | 10006839 | A1 | 8/2000 |
| DE | 102017119209 | A1 | 1/2019 |

(Continued)

OTHER PUBLICATIONS

German Search Report for corresponding German Patent Application No. 102022132404.4 dated Nov. 3, 2023; priority document.
(Continued)

*Primary Examiner* — David M Sinclair
(74) *Attorney, Agent, or Firm* — Greer, Burns & Crain, Ltd.

(57) ABSTRACT

In order to allow lid assembly, a method is provided for manufacturing a lid assembly configured for closing a cell body of a supercapacitor, the cell body comprising a bottom portion, a wall portion, and a top opening, the lid assembly comprising an electrically conductive lid member and an electrically insulating sealing member. The lid member and the sealing member are configured to cooperatively form an expansion chamber that is arranged between the lid member and the sealing member, wherein the expansion chamber is fluidly connectable to an interior of the cell body.

10 Claims, 17 Drawing Sheets

(56) References Cited

U.S. PATENT DOCUMENTS

| | | | | |
|---|---|---|---|---|
| 2021/0098200 | A1* | 4/2021 | Honda | H01G 9/0029 |

FOREIGN PATENT DOCUMENTS

| | | | | | |
|---|---|---|---|---|---|
| EP | 4202962 | A1 | | 6/2023 | |
| EP | 4224503 | A1 | | 8/2023 | |
| FR | 1439148 | A | * | 5/1966 | H01F 27/02 |
| JP | H09129519 | A | * | 5/1997 | H01G 9/12 |

OTHER PUBLICATIONS

European Search Report and Written Opinion for corresponding European Patent Application No. 23209769 dated Jun. 14, 2024; 6 pages.

* cited by examiner

LID ASSEMBLY FOR AN ENERGY STORAGE CELL, KIT-OF-PARTS AND ENERGY STORAGE CELL COMPRISING THE LID ASSEMBLY

CROSS-REFERENCES TO RELATED APPLICATIONS

This application claims the benefit of the German patent application No. 102022132404.4 filed on Dec. 6, 2022, the entire disclosures of which are incorporated herein by way of reference.

FIELD OF THE INVENTION

The invention relates to a lid assembly for an energy storage cell, e.g., a supercapacitor. Furthermore, the invention relates to a kit-of-parts and an energy storage cell that comprise the lid assembly.

The invention relates to a current tab member for an electrode assembly of an energy storage cell, e.g., a supercapacitor. Furthermore, the invention relates to a kit-of-parts and an energy storage cell that comprise the current tab member.

The invention relates to a method for manufacturing a supercapacitor.

BACKGROUND OF THE INVENTION

In industrial applications supercapacitors are typically manufactured using cylindrical cans, for example, for the convenience of mass production. Specifically, supercapacitors that are based on microporous carbon seem to be the way of the future. However, it is not always easy to fill the electrolyte into the can.

Currently, the can is closed with a lid that has a small opening through which the electrolyte is introduced. When coming into contact with the electrode assembly, the electrolyte typically adsorbs to the micropores thereby releasing energy in the form of heat. The typical electrolyte compositions that are used have a rather low boiling point and may start to boil from the adsorption heat alone. It is therefore possible for the electrolyte to spill from the small opening in the lid possibly causing delays in manufacturing.

It should be noted that due to the much smaller overall electrode surface, conventional batteries, e.g., lithium ion batteries, do not experience this phenomenon.

SUMMARY OF THE INVENTION

An object of the invention is to provide an improved manufacturing method that preferably allows to reduce delays in manufacturing and/or to improve the production rate.

The invention provides a method for manufacturing a supercapacitor for storing electrical energy, the method comprising:

a) providing a cell body that has a bottom portion, a wall portion, and a top opening, wherein the cell body is integrally formed as a single unitary member;
b) inserting through the top opening an electrode assembly that has a negative electrode and a positive electrode, and the electrodes are separated by a separator, preferably each electrode including an active material, e.g. a carbon material, that includes micropores;
c) fixing the electrode assembly to the bottom portion in an electrically conductive manner;
d) filling an electrolyte through the top opening so that the electrode assembly gets immersed in the electrolyte;
e) closing the top opening with a lid assembly thereby forming a cell interior that contains the electrode assembly immersed in the electrolyte; and
f) fixing the lid assembly to the cell body, thereby obtaining the supercapacitor.

Preferably, the bottom portion is formed as a unitary portion without discontinuities or cavities in the material.

Preferably, in step a) the bottom portion is provided with a bottom protrusion that protrudes outside the cell body in an axial direction.

Preferably, in step a) the bottom protrusion is provided in the center of the bottom portion and the at least one exterior welding groove extends from the bottom protrusion in a radial direction towards the periphery.

Preferably, in step b) the electrode assembly is a wound electrode assembly.

Preferably, step b) comprises welding a current tab member to the electrode assembly before inserting the electrode assembly with the current tab member facing away from the bottom portion.

Preferably, the electrode assembly has a current tab member welded thereon before inserting the electrode assembly with the current tab member facing away from the bottom portion.

Preferably, the electrode assembly comprises an insulating member that is arranged to electrically insulate the current tab member from the cell body, preferably form the wall portion, when the electrode assembly is inserted into the cell body.

Preferably, step b) comprises inserting through the top opening a current tab member and contacting the electrode assembly with the current tab member.

Preferably, step c) comprises fixing the current tab member to the electrode assembly.

Preferably, step c) comprises welding the current tab member to the electrode assembly.

Preferably, step c) includes welding the electrode assembly to the bottom portion.

Preferably, in step c) the electrode assembly is welded to the bottom portion with one continuous weld seam that is longer than the length of the exterior groove along its longitudinal direction or with at least two weld seams.

Preferably, in step a) the bottom portion is provided with at least one exterior welding groove that includes a welding groove base, and in step c) the electrode assembly is welded to the welding groove base by welding from outside the cell body.

Preferably, step d) comprises cooling the electrolyte before filling of the electrolyte. Preferably, step d) comprises cooling the electrolyte during filling of the electrolyte. Preferably, step d) comprises cooling the electrolyte for a predetermined amount of time after filling of the electrolyte.

Preferably, step d) comprises contacting the cell body and/or the electrode assembly with a heat sink before filling of the electrolyte. Preferably, step d) comprises contacting the cell body and/or the electrode assembly with a heat sink during filling of the electrolyte. Preferably, step d) comprises contacting the cell body and/or the electrode assembly with a heat sink for a predetermined amount of time after filling of the electrolyte.

Preferably, step d) comprises cooling the cell body and/or the electrode assembly before filling of the electrolyte. Preferably, step d) comprises cooling the cell body and/or the electrode assembly during filling of the electrolyte. Preferably, step d) comprises cooling the cell body and/or the electrode assembly for a predetermined amount of time after filling of the electrolyte.

Preferably, in step d) cooling is performed such that the electrolyte is prevented from boiling.

Preferably, in step d) cooling is performed such that the electrolyte is kept below its flash point.

Preferably, in step e) during closing the top opening electrolyte present on the wall portion is wiped towards the bottom portion by the lid assembly.

Preferably, the lid assembly comprises a sealing member that has at least one wiper portion, wherein, upon inserting the lid assembly, the wiper portion is wiping electrolyte present on the wall portion towards the bottom portion.

Preferably, in step e) closing the top opening includes inserting the lid assembly into the top opening.

Preferably, step f) comprises welding the lid assembly to the cell body.

Preferably, step f) comprises laser welding the lid assembly to the cell body.

Preferably, the laser beam is directed parallel to the wall portion so as to impinge on a boundary area between the lid assembly and the wall portion.

Preferably, at least the steps d), e) and f) are performed under vacuum.

The invention provides a supercapacitor that is obtainable by performing a previously described method.

The invention provides a method for manufacturing a supercapacitor for storing electrical energy, the method comprising:

a) providing a cell body that has a bottom portion, a wall portion, and a top opening, wherein the cell body is integrally formed as a single unitary member, and the bottom portion has provided therein a bottom fluid passage;
b) inserting through the top opening an electrode assembly that has a negative electrode and a positive electrode, and the electrodes are separated by a separator, preferably each electrode including an active material, e.g. a carbon material, that includes micropores;
c) fixing the electrode assembly to the bottom portion in an electrically conductive manner;
d) closing the top opening with a lid assembly thereby forming a cell interior that contains the electrode assembly in a dry state, and fixing the lid assembly to the cell body;
e) orienting the cell body such that the bottom fluid passage is facing downward in a vertical direction;
f) injecting an electrolyte through the bottom fluid passage such that the electrode assembly gets wetted by the electrolyte;
g) closing the bottom fluid passage with a plug member and fixing the plug member to the bottom portion, thereby obtaining the supercapacitor.

Preferably, the steps d), e) and f) are performed in the order d)-e)-f). Preferably, the steps d), e) and f) are performed in the order e)-f)-d).

Preferably, at least step f) is performed under vacuum.

Preferably, in step a) the bottom portion is provided with a bottom protrusion that protrudes outside the cell body in an axial direction, and the bottom fluid passage is formed on the bottom protrusion.

Preferably, in step a) the bottom protrusion is provided in the center of the bottom portion and at least one exterior welding groove extends from the bottom protrusion in a radial direction towards the periphery.

Preferably, in step a) the bottom portion is formed as a unitary portion without discontinuities or cavities in the material.

Preferably, in step b) the electrode assembly is a wound electrode assembly.

Preferably, step b) comprises welding a current tab member to the electrode assembly before inserting the electrode assembly with the current tab member facing away from the bottom portion.

Preferably, the electrode assembly has a current tab member welded thereon before inserting the electrode assembly with the current tab member facing away from the bottom portion.

Preferably, step b) comprises welding a bottom current tab member to the electrode assembly before inserting the electrode assembly with the bottom current tab member contacting the bottom portion.

Preferably, in step b) the electrode assembly has a bottom current tab member welded thereon before inserting the electrode assembly with the bottom current tab member contacting the bottom portion.

Preferably, in step c) the bottom current tab member is welded to the bottom portion.

Preferably, step f) comprises cooling the electrolyte before injecting of the electrolyte. Preferably, step f) comprises cooling the electrolyte during injecting of the electrolyte. Preferably, step f) comprises cooling the electrolyte for a predetermined amount of time after injecting of the electrolyte.

Preferably, step f) comprises contacting the cell body and/or the electrode assembly with a heat sink before injecting of the electrolyte. Preferably, step f) comprises contacting the cell body and/or the electrode assembly with a heat sink during injecting of the electrolyte. Preferably, step f) comprises contacting the cell body and/or the electrode assembly with a heat sink for a predetermined amount of time after injecting of the electrolyte.

Preferably, step f) comprises cooling the cell body and/or the electrode assembly before injecting of the electrolyte. Preferably, step f) comprises cooling the cell body and/or the electrode assembly during injecting of the electrolyte. Preferably, step f) comprises cooling the cell body and/or the electrode assembly for a predetermined amount of time after injecting of the electrolyte.

Preferably, in step f) cooling is performed such that the electrolyte is prevented from boiling.

Preferably, in step f) cooling is performed such that the electrolyte is kept below its flash point.

Preferably, in step g) the plug member is fixed by welding to the bottom portion. Preferably, in step g) the plug member is fixed by welding to the bottom current tab member.

Preferably, step g) comprises laser welding the plug member to the bottom portion. Preferably, step g) comprises laser welding the plug member to the bottom current tab member.

Preferably, the laser beam is directed parallel to the wall portion so as to impinge on a boundary area between the plug member and the bottom portion. Preferably, the laser beam is directed parallel to the wall portion so as to impinge on a boundary area between the bottom current tab member and the plug member.

Preferably, the electrode assembly comprises an insulating member that is arranged to electrically insulate the current tab member from the cell body, preferably form the wall portion, when the electrode assembly is inserted into the cell body.

Preferably, step b) comprises inserting through the top opening a current tab member and contacting the electrode assembly with the current tab member.

Preferably, step c) comprises fixing the current tab member to the electrode assembly.

Preferably, step c) comprises welding the current tab member to the electrode assembly.

Preferably, step c) includes welding the electrode assembly to the bottom portion.

Preferably, in step c) the electrode assembly is welded to the bottom portion with one continuous weld seam that is longer than the length of the exterior groove along its longitudinal direction or with at least two weld seams.

Preferably, in step a) the bottom portion is provided with at least one exterior welding groove that includes a welding groove base, and in step c) the electrode assembly is welded to the welding groove base by welding from outside the cell body.

Preferably, in step d) during closing the top opening electrolyte present on the wall portion is wiped towards the bottom portion by the lid assembly.

Preferably, the lid assembly comprises a sealing member that has at least one wiper portion, wherein, upon inserting the lid assembly, the wiper portion is wiping electrolyte present on the wall portion towards the bottom portion.

Preferably, in step d) closing the top opening includes inserting the lid assembly into the top opening.

Preferably, step d) comprises welding the lid assembly to the cell body.

Preferably, step d) comprises laser welding the lid assembly to the cell body.

Preferably, the laser beam is directed parallel to the wall portion so as to impinge on a boundary area between the lid assembly and the wall portion.

The invention provides a supercapacitor, obtainable by a previously described method.

The invention provides a lid assembly configured for closing a cell body of a supercapacitor, the cell body comprising a bottom portion, a wall portion, and a top opening, the lid assembly comprising an electrically conductive lid member and an electrically insulating sealing member, wherein the lid member and the sealing member are configured to cooperatively form an expansion chamber that is arranged between the lid member and the sealing member, wherein the expansion chamber is fluidly connectable to an interior of the cell body.

Preferably, the lid member and the sealing member are in mechanical contact with each other in order to form the expansion chamber.

Preferably, the lid member comprises a first expansion chamber portion that includes a chamber top portion, that extends substantially parallel to the sealing member, and a first support protrusion that protrudes, preferably from the chamber top portion, towards the sealing member and contacts the sealing member, wherein the first support protrusion is disposed on a circumferential rim portion of the lid member.

Preferably, the lid member comprises a first expansion chamber portion that includes a second support protrusion that protrudes towards the sealing member and contacts the sealing member, wherein the second support protrusion is disposed radially inward from a circumferential rim portion of the lid member.

Preferably, the second support protrusion is recessed relative to the first support protrusion in the vertical direction.

Preferably, the lid member comprises a lid opening. Preferably, the lid opening includes a circumferential vertical wall and/or a tapered circumferential wall that widens in a direction towards the sealing member. Preferably, the lid opening includes a vertical sealing surface that is disposed on a circumferential sidewall of the lid opening and that contacts the sealing member in order to form a seal. Preferably, the lid opening includes a tapered sealing surface that expands downward and that contacts the sealing member in order to form a seal.

Preferably, the lid member comprises a welding groove that is disposed on a circumferential rim portion of the lid member. Preferably, the lid member comprises a welding surface that is disposed on the outermost circumference of the lid member.

Preferably, the sealing member includes a sealing shroud that protrudes upward and contacts the vertical sealing surface to form the seal. Preferably, the sealing member includes a bead sealing portion that is disposed to be in contact with the tapered sealing surface to form the seal.

Preferably, the sealing member comprises a second expansion chamber portion that includes a chamber bottom portion, that extends substantially parallel to the lid member. Preferably, the sealing member comprises a first sealing groove that is disposed on a circumferential rim portion of the sealing member, and the first sealing groove has inserted therein a portion of the lid member, preferably the first support protrusion.

Preferably, the sealing member comprises a second expansion chamber portion that includes a second sealing groove that is disposed radially inward from a circumferential rim portion of the sealing member, and the second sealing groove has inserted therein a portion of the lid member, preferably the second support protrusion. Preferably, the first sealing groove is recessed relative to the second sealing groove in the vertical direction.

The invention provides a cell body kit-of-parts for forming a cell body of a supercapacitor, the kit-of-parts comprising a cell body having a bottom portion, a wall portion, and a top opening; and a previously described lid assembly, that is insertable into the top opening so as to form a closed off cell interior.

The invention provides a cell body assembly for an energy storage cell, e.g., a supercapacitor, the cell body assembly comprising a preferred cell body kit-of-parts, wherein the lid assembly is fixed to the cell body so as to form a closed off cell interior, wherein the lid member is welded to the cell body, preferably the wall portion, wherein the sealing member contacts at least the cell body and/or the lid member to form a seal and electrical insulation.

The invention provides an energy storage cell, e.g. a supercapacitor, the energy storage cell comprising a preferred cell body assembly; an electrode assembly configured for storing electrical energy that is disposed in the cell interior, the electrode assembly having a current tab member, wherein the electrode assembly is conductively fixed to the cell body, and the current tab is electrically insulated from the cell body by the sealing member.

Preferably, the sealing member contacts the current tab member in order to seal and close off the cell interior.

Preferably, the lid member includes a reinforcement structure, wherein preferably the reinforcement structure includes a plurality of ribs that extend between the first support protrusion and the second support protrusion.

Preferably, the sealing member includes a wiper portion that is disposed on an outermost circumferential surface.

Preferably, the wiper portion includes a plurality of alternating grooves and protrusions.

The invention provides an electrically conductive lid member for a lid assembly of a cell body, the lid member comprising:

a lid base portion having formed therein a lid opening;

a first support protrusion that protrudes from the lid base portion downward in a vertical direction;

a second support protrusion that protrudes from the lid base portion downward in the vertical direction;

wherein the first support protrusion, the second support protrusion and a part of the lid base portion located therebetween form a first expansion chamber portion, that is configured, upon engaging a second expansion chamber portion, for forming an expansion chamber for a fluid.

Preferably, the lid member comprises a welding groove that is disposed on a circumferential rim portion of the lid base portion. Preferably, the welding groove includes a groove sidewall that is disposed on the outermost circumference of the lid base portion. Preferably, the lid base portion includes a welding surface that is disposed on the outermost circumference of the lid base portion. Preferably, the welding surface includes a surface of the groove sidewall. Preferably, the first support protrusion tapers downward.

Preferably, the lid opening includes a vertical sealing surface that is disposed on a circumferential sidewall of the lid opening. Preferably, the lid opening includes a tapered sealing surface that expands downward. Preferably, the tapered sealing surface is disposed adjacent to the vertical sealing surface. Preferably, the tapered sealing surface is disposed adjacent to the second support protrusion. Preferably, the tapered sealing surface is interposed between the vertical sealing surface and the second support protrusion. Preferably, the lid base portion includes a reinforcement structure. Preferably, the reinforcement structure includes a plurality of ribs that extend between the first support protrusion and the second support protrusion. Preferably, the ribs extend from the first support protrusion to the second support protrusion.

The invention provides an electrically insulating sealing member for a lid assembly of a cell body, the sealing member comprising:

a sealing base portion having formed therein at least one fluid opening;

a first sealing groove that protrudes from the sealing base portion upward in a vertical direction;

a second sealing groove that protrudes from the sealing base portion upward in a vertical direction;

wherein the first sealing groove, the second sealing groove and a part of the sealing base portion located therebetween form a second expansion chamber portion, that is configured, upon engaging a first expansion chamber portion, for forming an expansion chamber for a fluid, wherein the expansion chamber is fluidly connectable via the at least one fluid opening.

Preferably, the sealing member includes a wiper portion that is disposed on an outermost circumferential surface. Preferably, the wiper portion includes a plurality of alternating grooves and protrusions. Preferably, the sealing member includes a bead sealing portion that is disposed adjacent to the second sealing groove. Preferably, the sealing member includes a sealing opening that is defined by a circumferential sidewall. Preferably, the sealing member includes a sealing shroud that preferably protrudes from the circumferential sidewall upward. Preferably, the sealing opening includes a tapered sealing portion that expands downward. Preferably, the sealing opening includes a second bead sealing portion that is disposed on the smallest diameter of the tapered sealing portion.

Preferably, the lid member includes a lid welding groove that is disposed on an upper surface that faces away from the sealing member, and the lid welding groove extends along a circumferential rim portion of the lid member.

The invention provides a current tab member for an electrode assembly of an energy storage cell, e.g., a supercapacitor, the electrode assembly comprising a negative electrode and a positive electrode, each electrode including a carbon material that includes micropores, and the electrodes are separated by a separator, wherein the current tab member comprises:

a terminal portion;

at least one contacting portion that is configured to conductively contact the electrode assembly; and a heat sink portion that is interposed between and adjacent to the terminal portion and the contacting portion.

Preferably, the current tab member is integrally formed as a single unitary member.

Preferably, the current tab member includes a plurality of contacting portions that protrude from the heat sink portion in a radial direction.

Preferably, the contacting portions are evenly distributed in a circumferential direction.

Preferably, each contacting portion includes a tab welding portion that extends in a radial direction.

Preferably, the heat sink portion includes at least one tapered heat sink portion that tapers from the contacting portion towards the terminal portion.

Preferably, each tapered heat sink portion includes a notch that continuously transitions into the tab welding portion.

Preferably, the tab welding portion is formed as a tab welding groove. Preferably, the notch continuously transitions into the tab welding groove.

Preferably, the heat sink portion includes at least one thermal conductive leg portion that protrudes from the heat sink portion along the contacting portion.

Preferably, the tab welding portion is formed as a tab welding groove, and wherein the thermal conductive leg portion forms at least one sidewall of the tab welding groove.

The invention provides a lid assembly configured for closing a cell body of a supercapacitor, the cell body comprising a bottom portion, a wall portion, and a top opening, the lid assembly comprising an electrically insulating sealing member and a previously described current tab member, wherein the sealing member and the current tab member are in contact with each other, wherein the sealing member includes a plurality of fluid openings, and the fluid openings and the contacting portions are configured such that irrespective of a relative orientation of the current tab member and the sealing member an equivalent of at least one fluid opening is unobstructed by the current tab member.

Preferably, the sealing member includes a sealing opening that is defined by a circumferential sidewall and the terminal portion is inserted in the sealing opening such that a seal is formed between the terminal portion and the circumferential sidewall.

Preferably, the sealing opening includes a tapered sealing portion that expands downward, wherein the tapered sealing portion is in contact with the heat sink portion.

Preferably, the sealing opening includes a second bead sealing portion that is disposed on the smallest diameter of the tapered sealing portion, and the second bead sealing portion is in contact with both the terminal portion and the heat sink portion.

Preferably, the lid assembly comprises an electrically conductive lid member, wherein the lid member and the sealing member are configured to cooperatively form an expansion chamber that is arranged between the lid member and the sealing member, wherein the expansion chamber is fluidly connectable to an interior of the cell body, and the current tab member is in contact with the sealing member and electrically insulated from the lid member by the sealing member.

The invention provides a cell body kit-of-parts for forming a cell body of a supercapacitor, the kit-of-parts comprising a cell body having a bottom portion, a wall portion, and a top opening; a previously described lid assembly, that is insertable into the top opening so as to form a closed off cell interior.

The invention provides an energy storage cell, e.g., a supercapacitor, the energy storage cell comprising a cell body having a bottom portion, a wall portion, and a top opening and at least one of the following feature groups:

a) a lid assembly that is insertable into the top opening so as to form a closed off cell interior, the lid assembly comprising an electrically conductive lid member and an electrically insulating sealing member; and an electrode assembly configured for storing electrical energy that is disposed in the cell interior, the electrode assembly having a previously described current tab member; and/or b) a previously described lid assembly; and an electrode assembly configured for storing electrical energy that is disposed in the cell interior, the electrode assembly having a current tab member.

Preferably the lid member is configured as a previously described lid member. Preferably the sealing member is described as a previously described sealing member.

BRIEF DESCRIPTION OF THE DRAWINGS

Advantageous effects of the ideas presented herein will be made apparent in the following detailed description. It should be noted that not all advantageous effects need to be achieved at the same time or with the same intensity. Embodiments of the invention are described in more detail with reference to the accompanying schematic drawings that are listed below.

DETAILED DESCRIPTION OF THE PREFERRED EMBODIMENTS

Figure 1:
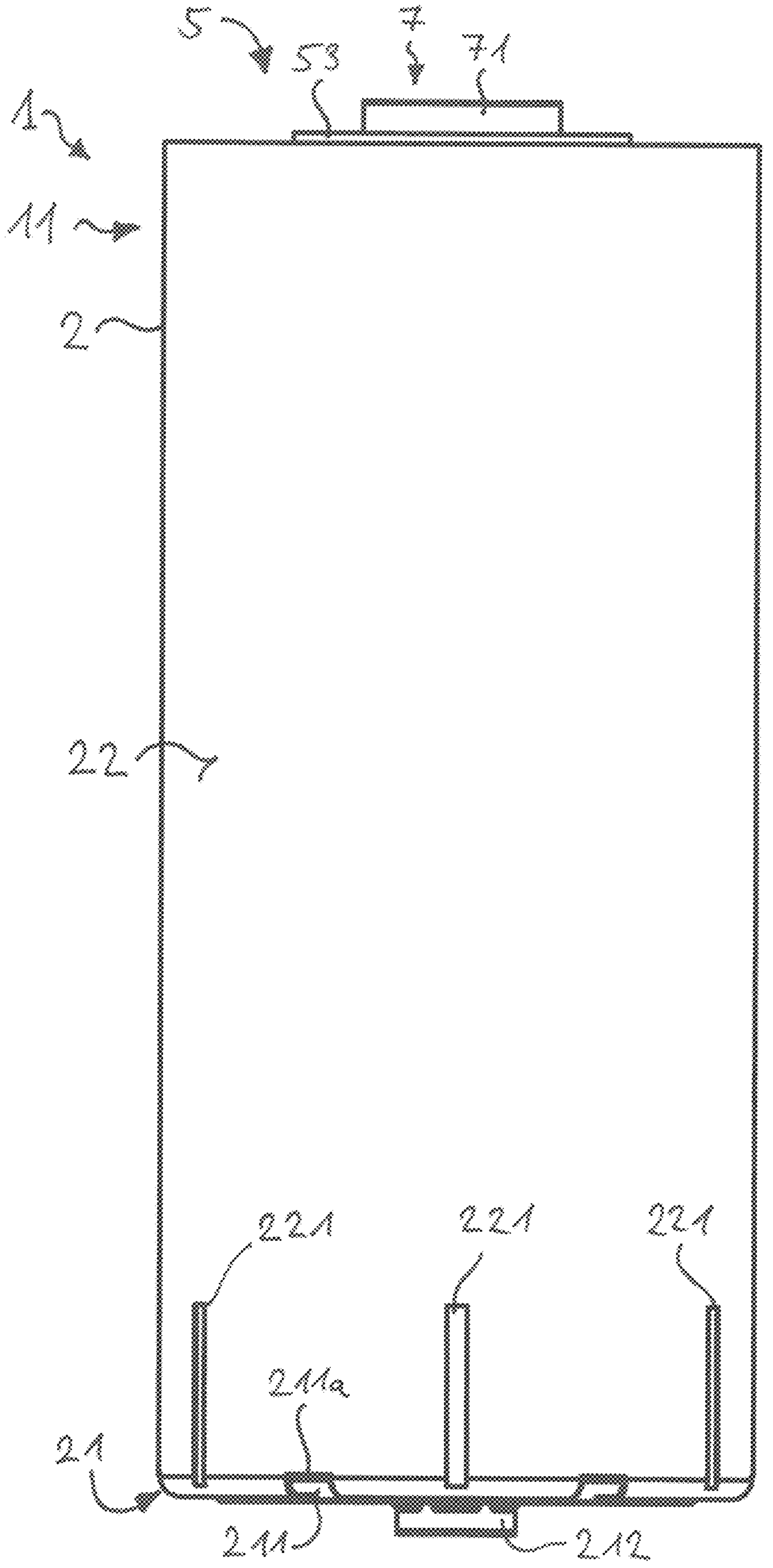
FIG. 1 depicts an embodiment of an energy storage cell.
Figure 2:
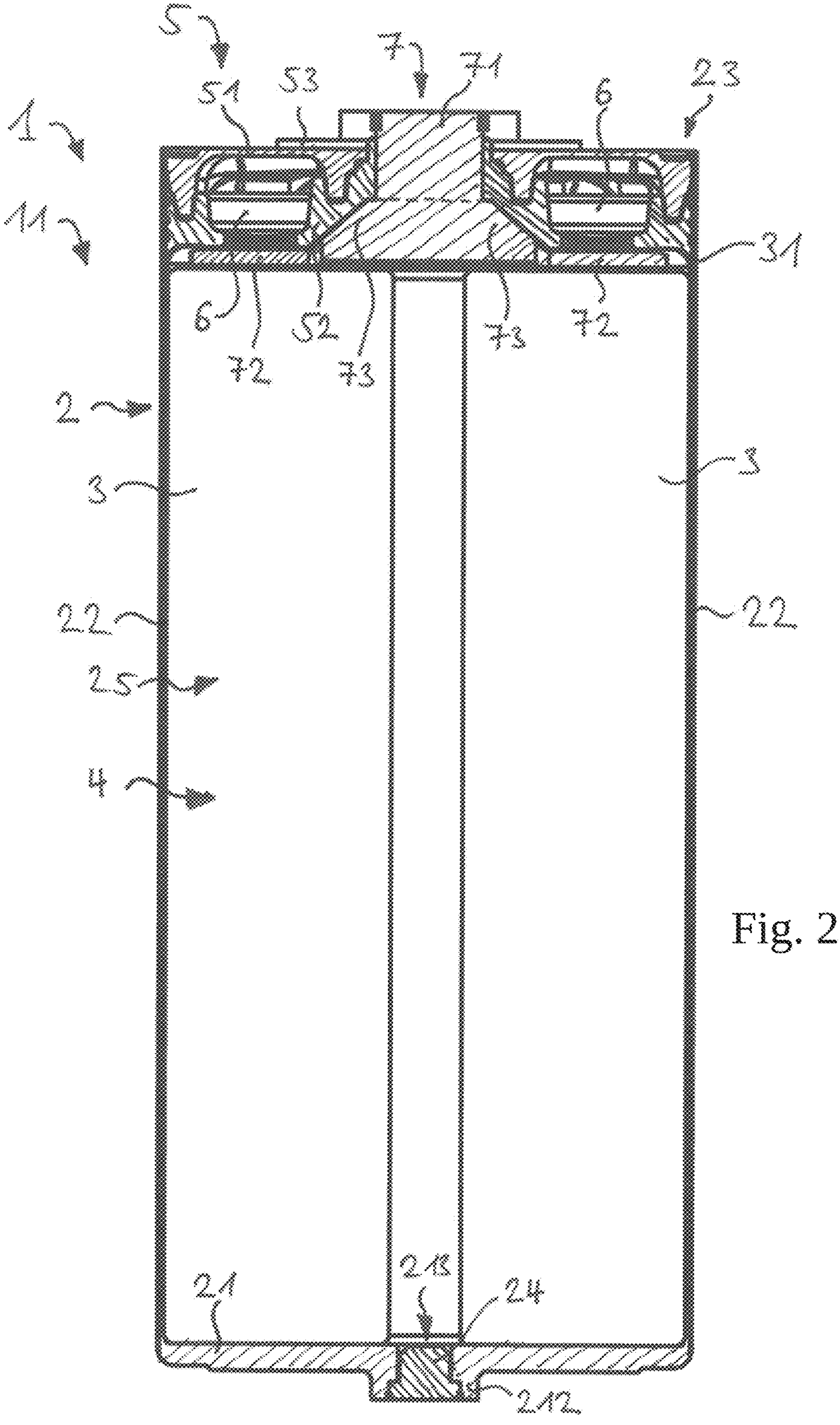
FIG. 2 depicts a longitudinal cross-section of the energy storage cell FIG. 1.
Figure 3:
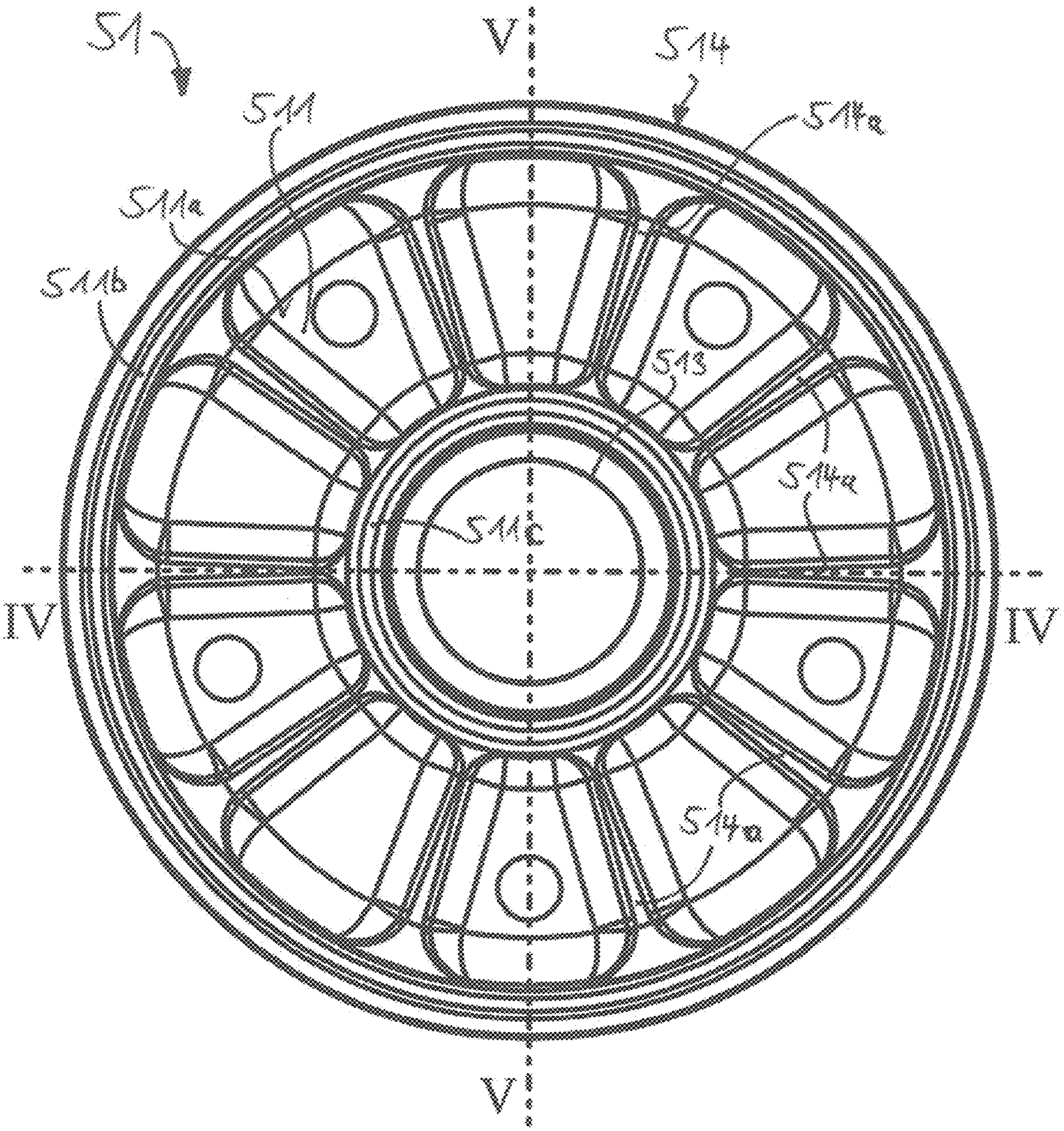
FIG. 3 depicts a bottom view of a lid member.
Figure 4:
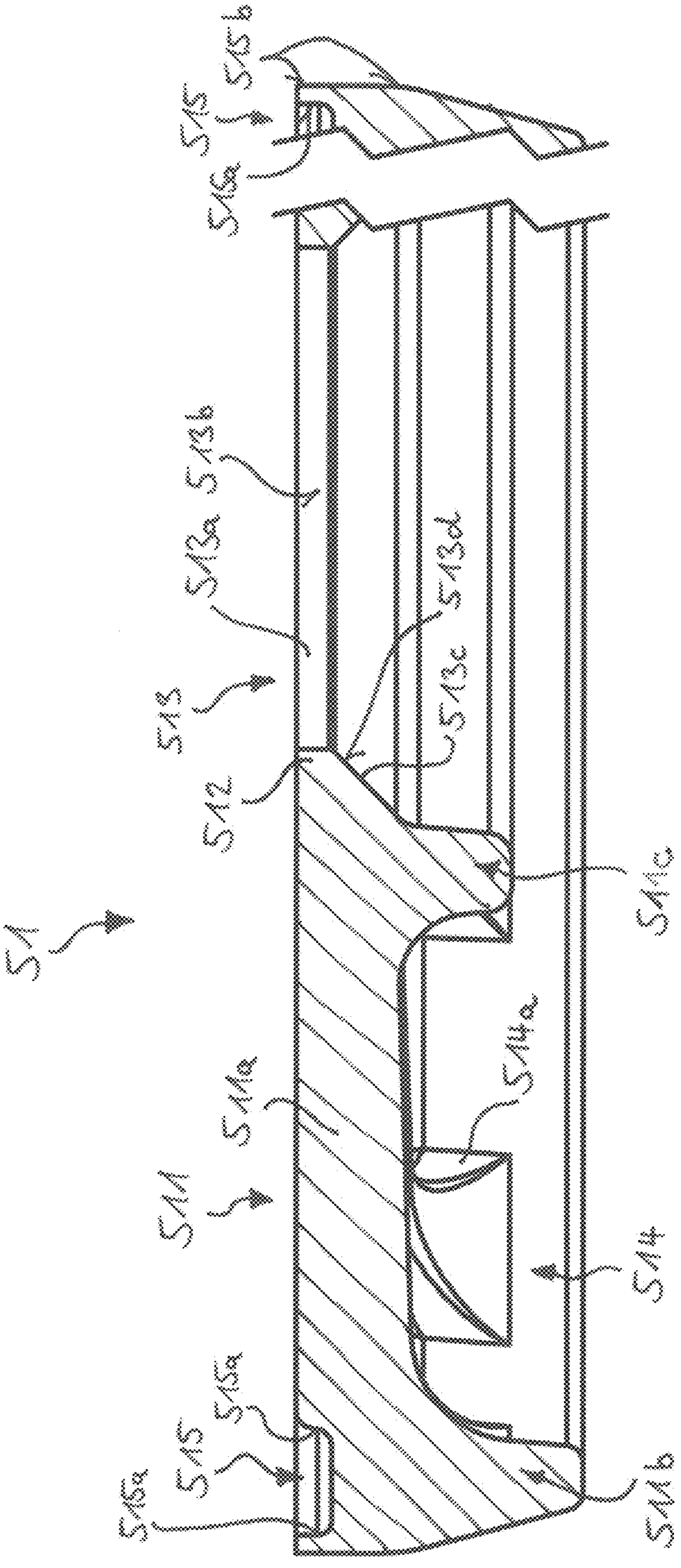
FIG. 4 depicts a cross-section of the lid member of FIG. 3 along line IV-IV.
Figure 5:
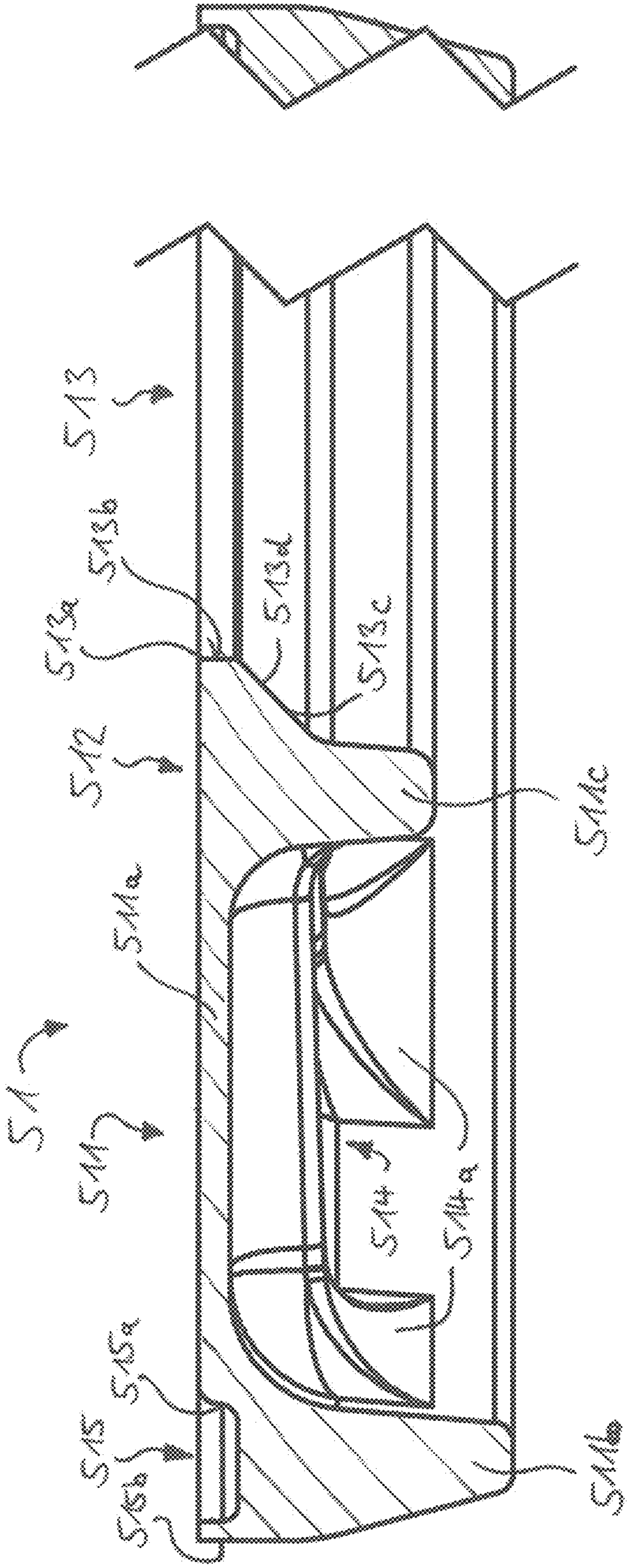
FIG. 5 depicts a cross-section of the lid member of FIG. 3 along line V-V.
Figure 6:
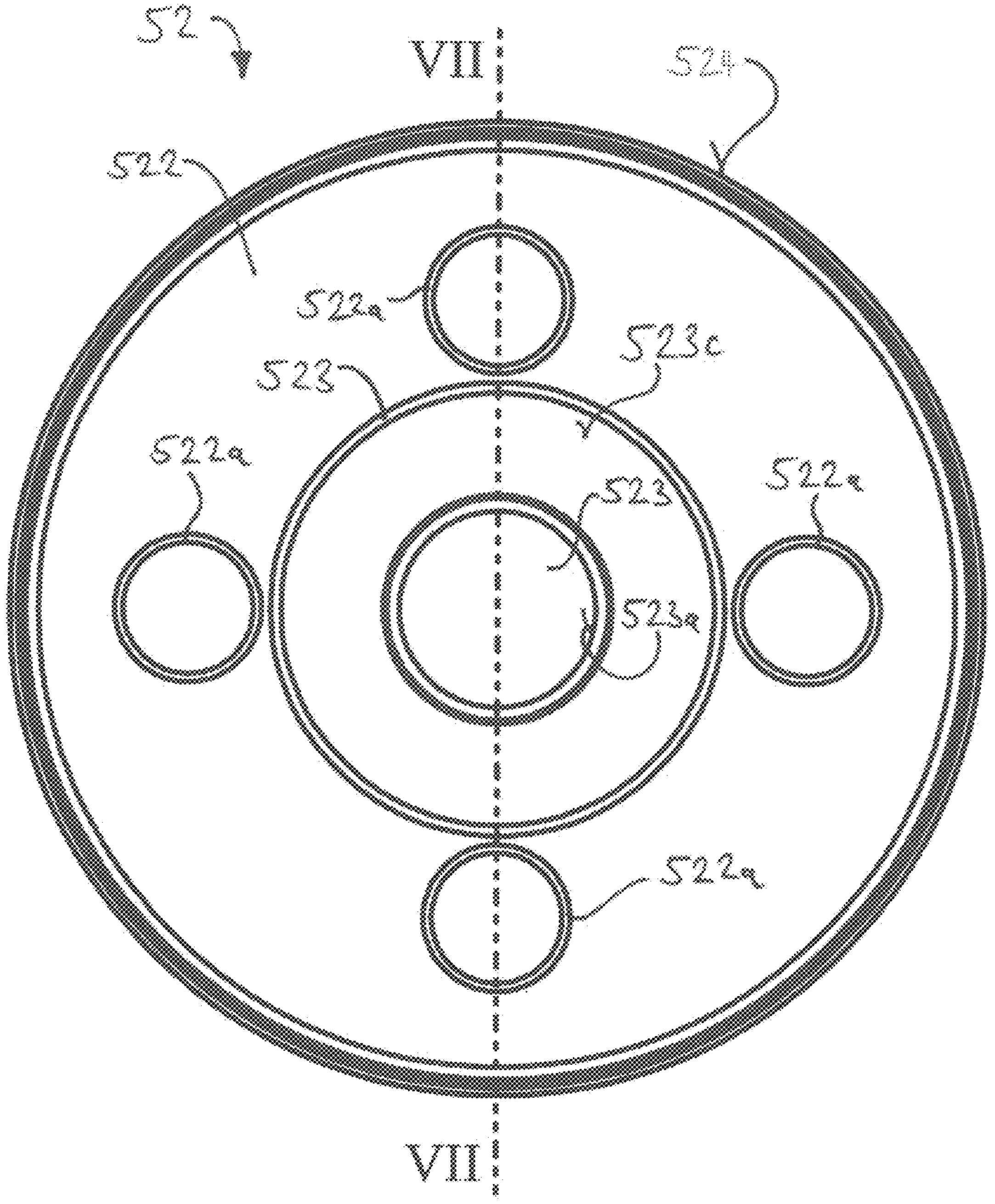
FIG. 6 depicts a bottom view of a sealing member.
Figure 7:
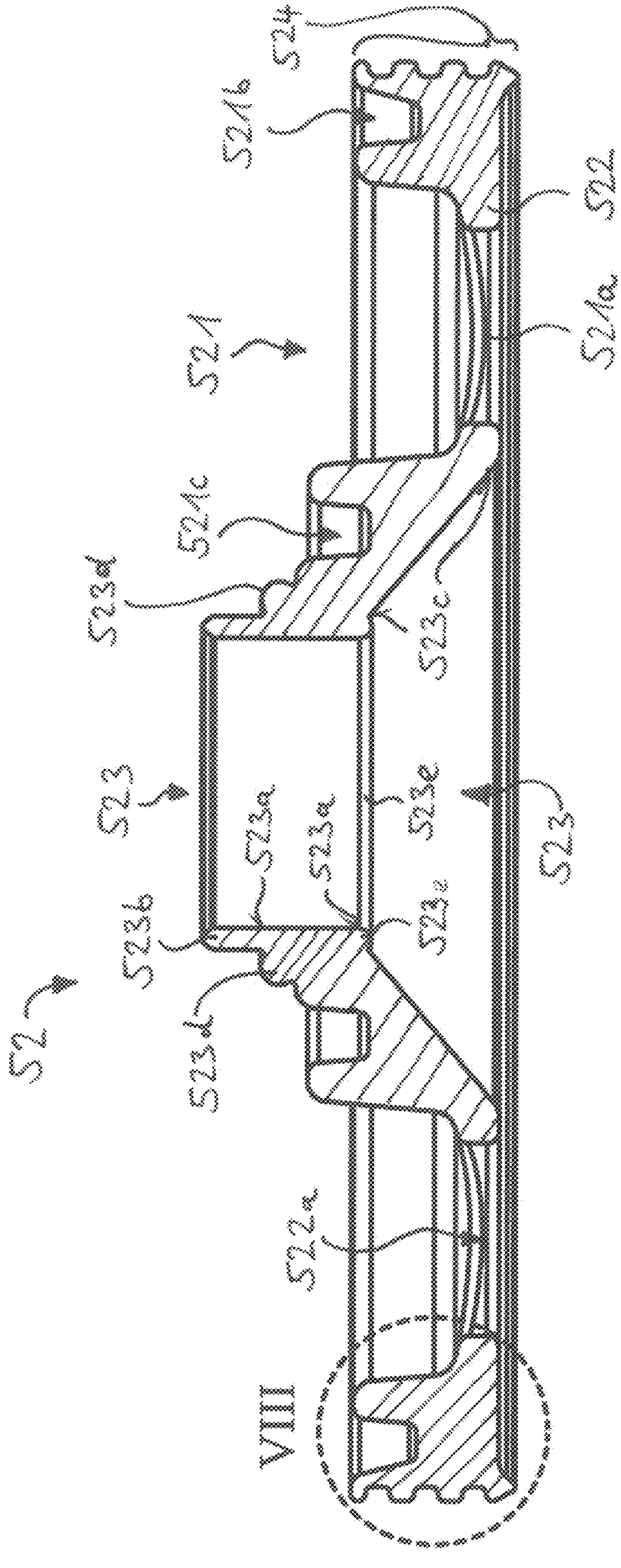
FIG. 7 depicts a cross-section of the sealing member of FIG. 6 along line VII-VII.
Figure 8:
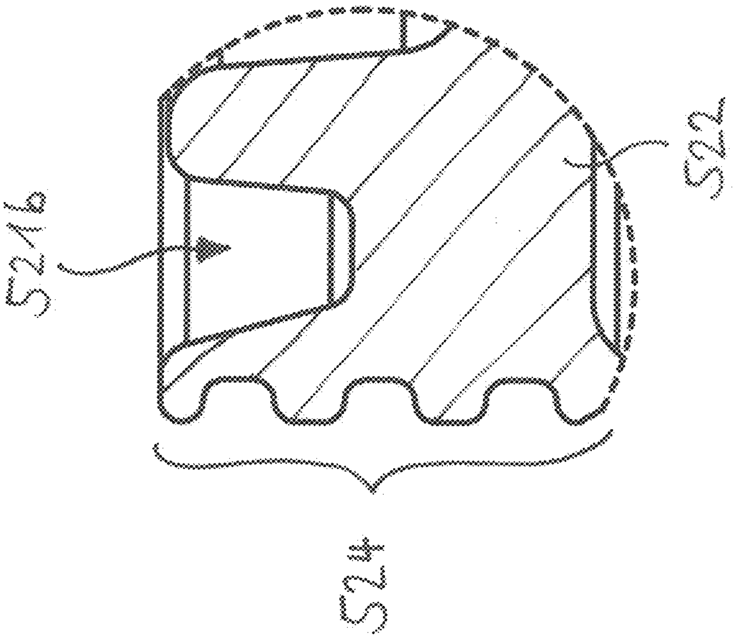
FIG. 8 depicts detail VIII of FIG. 7.

Referring to FIG. 1 and FIG. 2, an energy storage cell 1 is depicted. The energy storage cell 1 may be configured as a supercapacitor 11.

The energy storage cell 1 may comprise a cell body 2. The cell body 2 may have a cylindrical shape. It is also possible for the cell body 2 to be a cuboid shape. Irrespective of the shape the terms radial, axial and circumferential as used herein apply to the cylindrical shape and, in the same way, to the other shapes. The cell body 2 may be formed as an open can. The cell body 2 is preferably integrally formed as a single unitary member. The cell body 2 may be formed by impact extrusion or any other suitable forming method. The cell body 2 may be made of a lightweight metal material, such as aluminum.

The cell body 2 may comprise a bottom portion 21. The bottom portion may be generally disk-shaped. The bottom portion 21 may be formed as a massive portion without discontinuities.

The bottom portion 21 may include a plurality of exterior welding grooves 211. Each exterior welding groove 211 may be disposed on an exterior surface of the bottom portion. Each exterior welding groove 211 may extend from a central portion of the bottom portion 21 in a radial direction. Each exterior welding groove 211 may include a welding groove base 211*a*, which is recessed with respect to the general surface of the bottom portion 21. The exterior welding groove 211 may be thinner as adjacent portions in an axial direction. The exterior welding groove 211 may be the thinnest portion of the bottom portion 21 in the axial direction.

The bottom portion 21 may include a bottom protrusion 212. The bottom protrusion 212 is preferably disposed on the center portion of the bottom portion 21. The bottom protrusion 212 may protrude from the bottom portion 21 downward in an axial direction. The bottom protrusion 212 may have a cylindrical shape. The bottom protrusion 212 may have other shapes, such as a cuboid shape, or any shape that is suitable for connecting energy storage cells to each other.

The bottom portion 21 may include a bottom fluid passage 213. The bottom fluid passage 213 may be formed in the center portion of the bottom portion 21. Preferably, the bottom fluid passage 213 is formed within the bottom protrusion 212.

The cell body 2 may include a wall portion 22. The wall portion 22 may extend upward in the axial direction. The wall portion 22 may extend along a circumferential direction of the cell body 2, so as to form an open can shape. The wall portion 22 may have at least one predetermined breaking portion 221. The predetermined breaking portion 221 is configured such that at a predetermined pressure inside the cell body 2, the predetermined breaking portion 221 structurally fails and releases the pressure from the cell body 2.

The cell body 2 may include a top opening 23. The top opening 23 is preferably defined by the wall portion 22. The top opening 23 is preferably circularly shaped.

The cell body 2 may include a plug member 24. The plug member 24 may be inserted into the bottom fluid passage 213. Preferably, the plug member 24 is welded to the bottom portion 21.

The bottom portion 21, the wall portion 22 and the top opening 23 may define a cell interior 25. In other words, the cell interior 25 is that volume of the cell body 2 that, when the top opening 23 is closed, e.g., by a lid, is inside the cell body 2.

Figure 9:
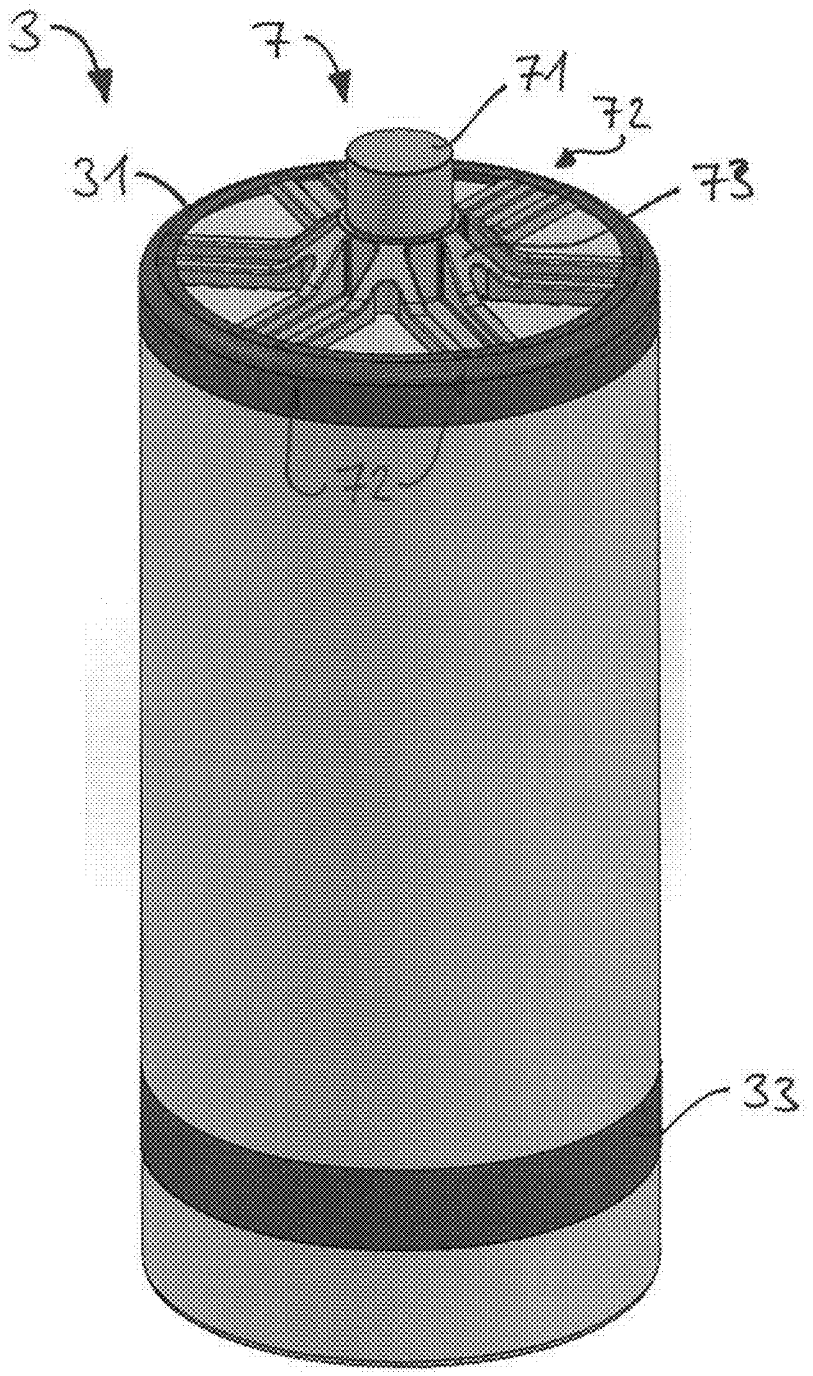
FIG. 9 depicts a perspective view of an electrode assembly.
Figure 10:
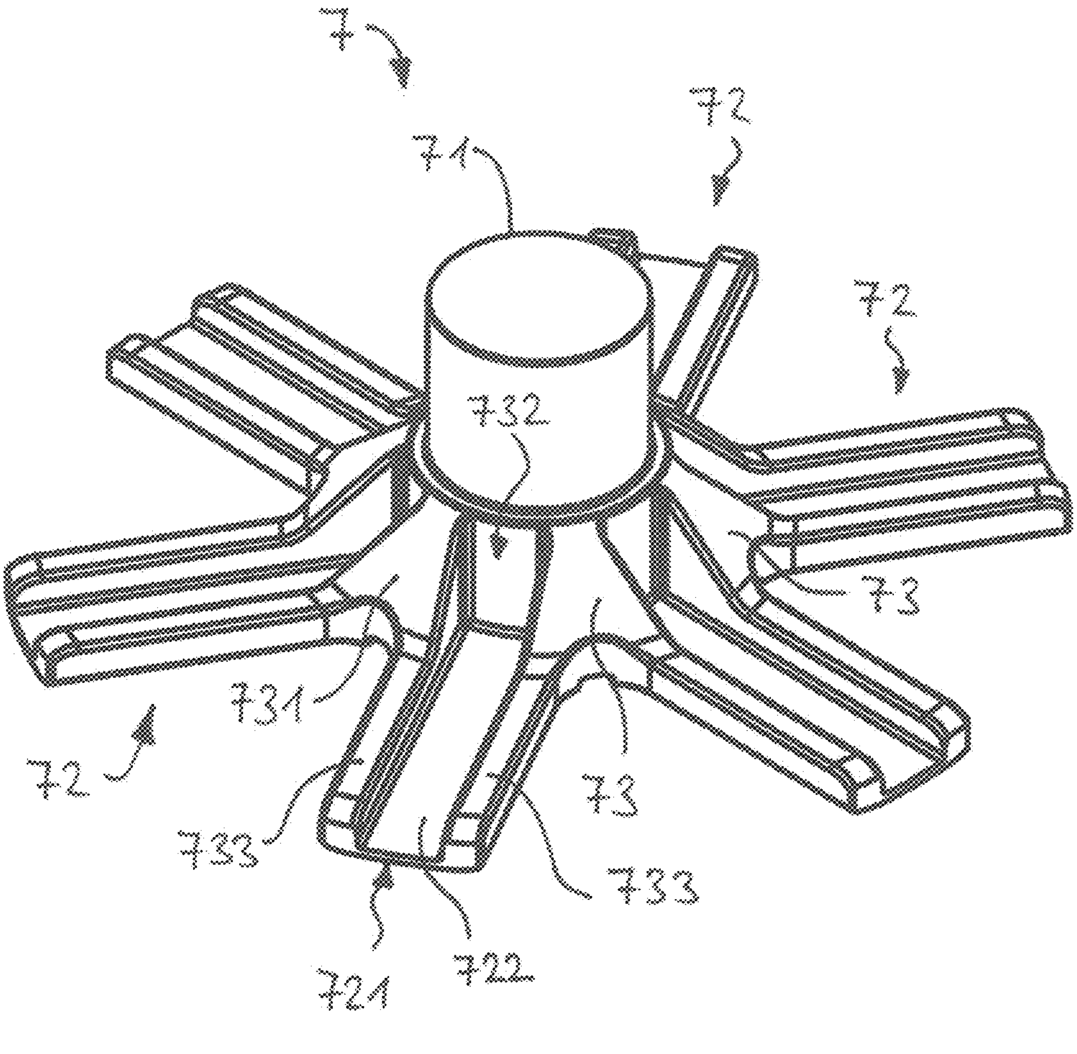
FIG. 10 depicts a perspective view of a current tab member.
Figure 11:
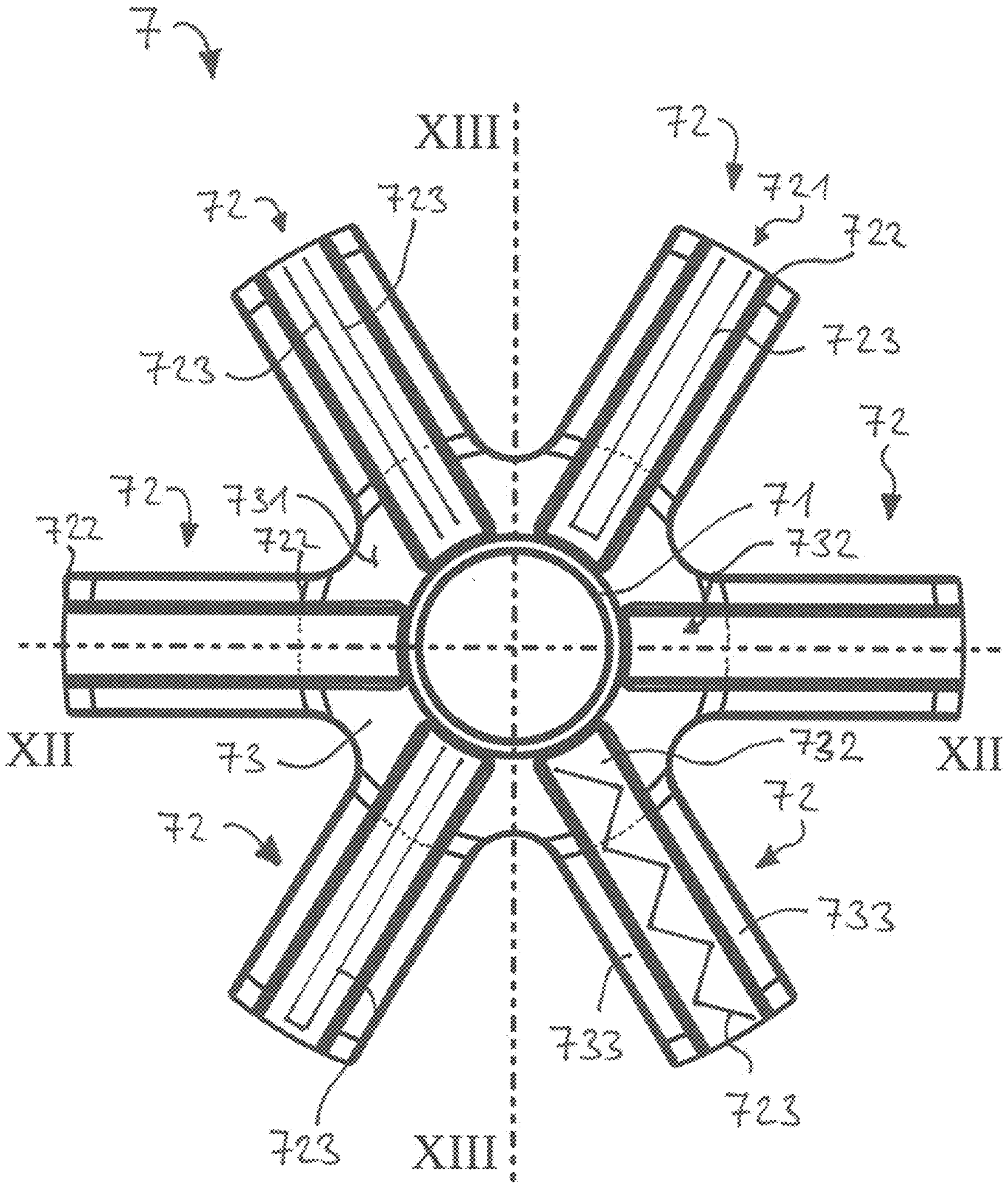
FIG. 11 depicts a top view of the current tab member of FIG. 10.
Figure 12:
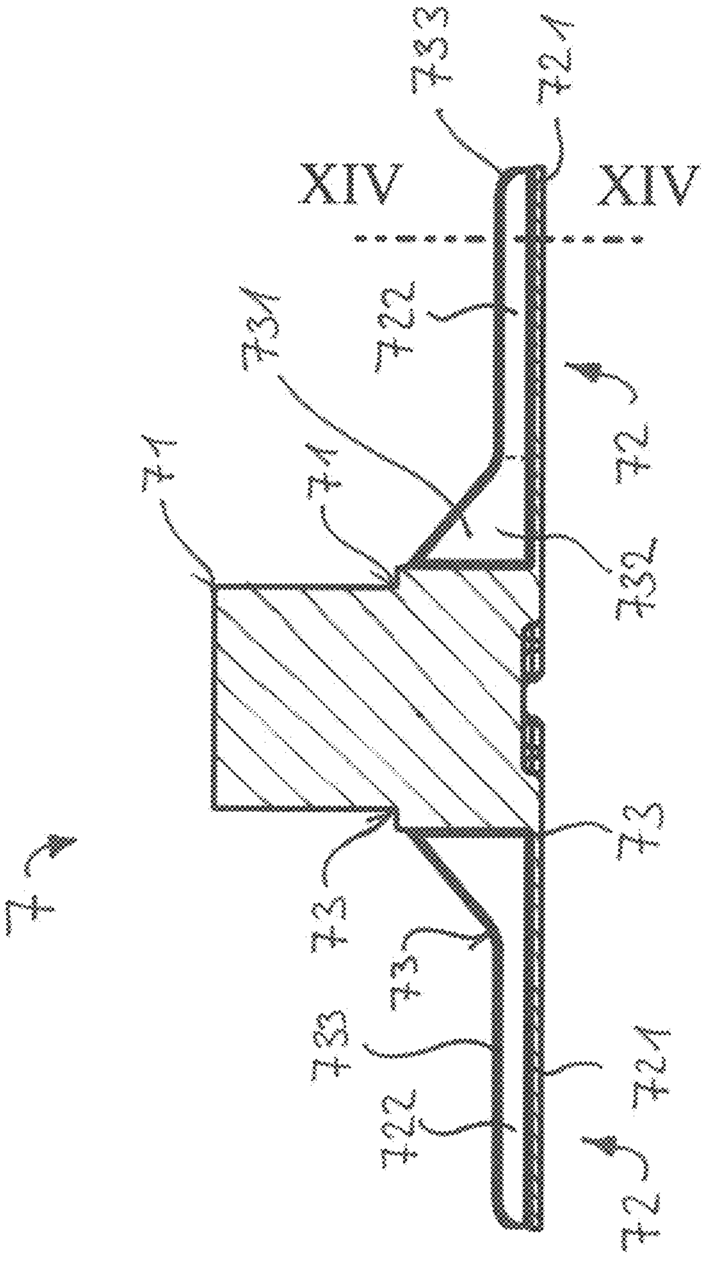
FIG. 12 depicts a cross-section of the current tab member of FIG. 11 along line XII-XII.
Figure 13:
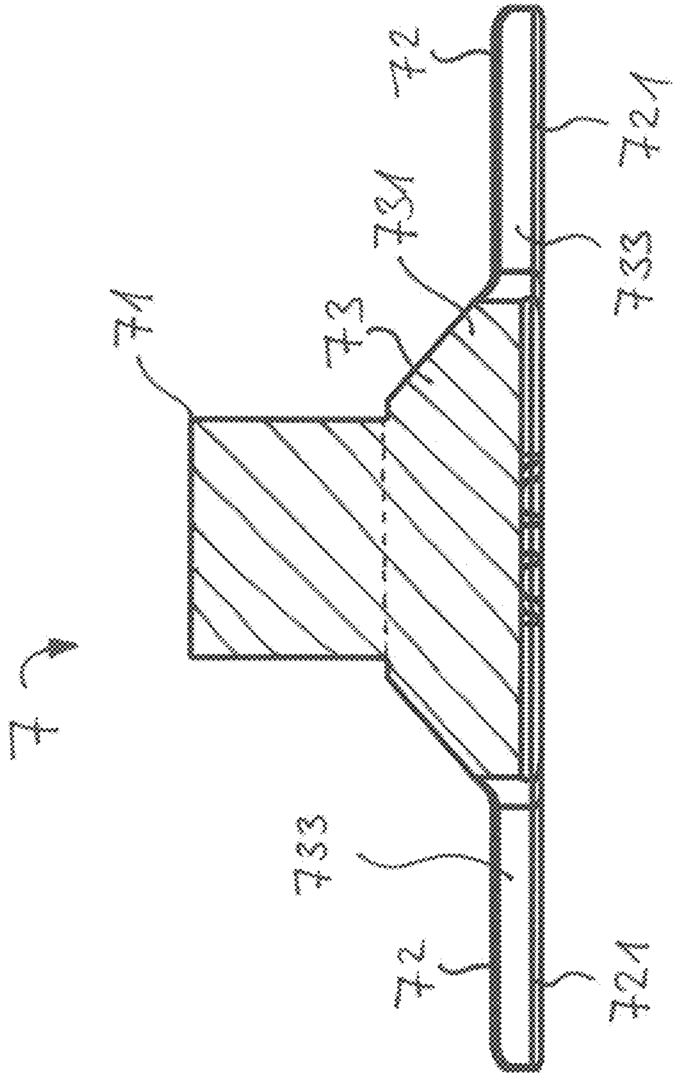
FIG. 13 depicts a cross-section of the current tab member of FIG. 11 along line XIII-XIII.
Figure 14:
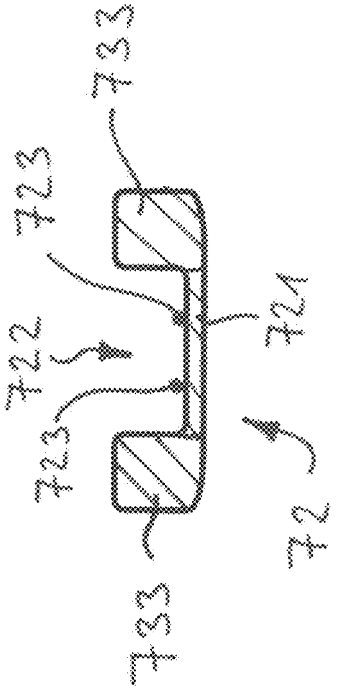
FIG. 14 depicts a cross-section of the current tab member of FIG. 12 along line XIV-XIV.

Referring to FIG. 2 and FIG. 9, an electrode assembly 3 is depicted. The electrode assembly 3 can be any electrode assembly that is typically used for supercapacitors. For example, the electrode assembly 3 may be a wound electrode assembly that has both the anode and the cathode wound up into a coil, wherein the electrodes are separated by a separator. At least one of the electrodes may comprise a microporous carbon material as part of an active material.

The electrode assembly 3 may include an insulating member 31 that is arranged towards the top of the electrode assembly 3. The insulating member 31 is configured for partial electrical insulation of the electrode assembly 3.

The electrode assembly 3 may include a fixation member 33 that holds the windings of the electrode assembly 3 together. The insulating member 31 and the fixation member 33 may be configured as an adhesive tape. The electrode assembly 3 is disposed in the cell interior 25.

The energy storage cell 1 may include an electrolyte 4. The electrolyte 4 can be any suitable electrolyte used in supercapacitors. The electrolyte 4 is also arranged within the cell interior 25.

The energy storage cell 1 may comprise a lid assembly 5. The lid assembly 5 can be inserted through the top opening 23 such that the cell interior 25 is closed off from the outside of the cell body 2. The lid assembly 5 can be fixed to the wall portion 22, preferably by welding.

Referring to FIG. 2 to FIG. 5, the lid assembly 5 may include a lid member 51. The lid member 51 is generally a flat extended member that is suitable to be inserted into the top opening 23. As depicted here, the lid member 51 is generally disk-shaped.

The lid member 51 may include a first expansion chamber portion 511. The first expansion chamber portion 511 is formed in the lid member 51. The first expansion chamber portion 511 may include a chamber top portion 511*a*, which is preferably partially formed by a lid base portion 512.

The first expansion chamber portion 511 may include a first support protrusion 151*b*. The first support protrusion 151*b* may be arranged on an outer rim portion. The first support protrusion 151*b* may protrude from the chamber top portion 511*a* axially downward. The first support protrusion 511*b* preferably extends along the whole circumferential direction along the outer rim portion.

The first expansion chamber portion 511 may include a second support protrusion 511*c*. The second support protrusion 511*c* may protrude from the chamber top portion 511*a* axially downward. The second support protrusion 511*c* may be recessed relative to the first support protrusion 151*b* along the axial direction. In other words, the second support protrusion 511*c* need not extend as far downward as the first support protrusion 151*b*. The second support protrusion 511*c* may be arranged radially closer to the center portion of the lid member 51 than the first support protrusion 151*b*.

The lid member 51 may include a lid base portion 512. The lid base portion 512 is generally a flat portion. As depicted here, the lid base portion 512 has roughly a disk-shape.

The lid member 51 may include a lid opening 513. The lid opening 513 is preferably arranged on the center portion of the lid base portion 512. The lid opening 513 may include a circumferential vertical wall 513*a*. The circumferential vertical wall 513*a* may extend in an axial direction. The circumferential vertical wall 513*a* may be configured as a vertical sealing surface 513*b* for forming a seal.

The lid opening 513 may further include a tapered circumferential wall 513*c*. The tapered circumferential wall 513*c* may begin at the bottom of the circumferential wall 513*a*. The tapered circumferential wall 513*c* may increase in diameter downward in the axial direction. The tapered circumferential wall 513*c* may be configured as a tapered sealing surface 513*d* for forming a seal.

The lid member 51 may further include a reinforcement structure 514. The reinforcement structure 514 may be formed on an inward side of the lid base portion 512 so as to face the cell interior 25. The reinforcement structure 514 may include a plurality of ribs 514*a*. The rib 514*a* may extend between the first support protrusion 151*b* and the second support protrusion 511*c*. The rib 514*a* may extend along the chamber top portion 511*a*.

The lid member 51 may include a lid welding groove 515. The lid welding groove 515 may be arranged on a top surface of the lid member 51. The lid welding groove 515 may be formed within the lid base portion 512. The lid welding groove 515 may be arranged on an outside surface of the lid base portion 512. The lid welding groove 515 may extend along a circumferential direction. The lid welding groove 515 may be formed on an outer rim portion of the lid member 51.

The lid welding groove 515 may include a plurality of groove sidewalls 515*a*. The lid welding groove 515 may further include a welding surface 515*b*. The welding surface 515*b* may extend along the radially outermost circumferential surface of the lid member 51. The welding surface 515*b* may extend along an axial direction. The welding surface 515*b* may extend around the whole circumference of the lid member 51.

Referring to FIG. 2 and FIG. 6 to FIG. 8, a sealing member 52 is depicted. The sealing member 52 may include a second expansion chamber portion 521. The second expansion chamber portion 521 is configured to match with the first expansion chamber portion 511.

The second expansion chamber portion 521 may include a chamber bottom portion 521*a*. The second expansion chamber portion 521 may include a first sealing groove 521*b*. The first sealing groove 521*b* may face axially upward from the chamber bottom portion 521*a*. Sidewalls of the first sealing groove 521*b* may protrude axially upward. The first sealing groove 521*b* may be arranged on an outer rim portion of the sealing member 52. The first sealing groove 521*b* preferably extends along the entire circumference of the sealing member 52.

The second expansion chamber portion 521 may include a second sealing groove 521*c*. The second sealing groove 521*c* may be formed radially closer to the center portion of the sealing member 52 than the first sealing groove 521*b*. The first sealing groove 521*b* and the second sealing groove 521*c* may form sidewalls of the second expansion chamber portion 521. The chamber bottom portion 521*a* may form a base of the second expansion chamber portion 521.

The sealing member 52 may include a sealing base portion 522. The sealing base portion 522 may include at least one fluid opening 522*a*. The fluid opening 522*a* is preferably arranged on the second expansion chamber portion 521. The fluid opening 522*a* is preferably disposed on the chamber bottom portion 521*a*.

The sealing member 52 may include a sealing opening 523. The sealing opening 523 is preferably formed in the center portion of the sealing member 52. The sealing opening 523 may include a circumferential sidewall 523*a*. The circumferential sidewall 523*a* may extend in the axial direction.

The sealing opening 523 may include a sealing shroud 523*b*. The sealing shroud 523*b* may protrude from the circumferential sidewall 523*a* upward in the axial direction. The sealing shroud 523*b* may have a smaller radial thickness compared to the circumferential sidewall 523*a*.

The sealing opening 523 may include a tapered sealing portion 523*c*. The tapered sealing portion 523*c* may be formed adjacent to the circumferential sidewall 523*a*. The tapered sealing portion 523*c* may face away from the sealing shroud 523*b*. The tapered sealing portion 523*c* may expand downward in the axial direction.

The sealing opening 523 may include a bead sealing portion 523*d*. The bead sealing portion 523*d* is preferably arranged at the transition between the circumferential sidewall 523*a* and the sealing shroud 523*b*. The bead sealing portion 523*d* may face axially upward. The bead sealing portion 523*d*, along the radial direction, may be interposed between the second sealing groove 521*c* and the circumferential sidewall 523*a*.

The sealing opening 523 may comprise second bead sealing portion 523*e*. The second bead sealing portion 523*e* may be arranged at the transition between the circumferential sidewall 523*a* and the tapered sealing portion 523*c*. The second bead sealing portion 523*e* may face downward in the axial direction. The second bead sealing portion 523*e*, along the radial direction, may be arranged at the same position as the circumferential sidewall 523*a* and/or the sealing shroud 523*b*. In other words, the second bead sealing portion 523*e* may be aligned with the circumferential sidewall 523*a* and/or with the sealing shroud 523*b* along the axial direction.

The sealing member 52 may include a wiper portion 524. The wiper portion 524 may be formed on the outermost circumferential surface of the sealing member 52. The wiper portion 524 may include a plurality of protrusions and recesses that are alternatingly arranged along the axial direction.

The lid assembly 5 may further include an insulating part 53 that is arranged outside the cell interior 25 and in contact with the lid member 51.

Referring again to FIG. 1 and FIG. 2, the energy storage cell 1 includes an expansion chamber 6. The expansion chamber 6 is interposed between the lid member 51 and the sealing member 52. The expansion chamber 6 is formed by the cooperation of the first expansion chamber portion 511 and the second expansion chamber portion 521. The expansion chamber 6 is fluidly connected to the cell interior 25 via the fluid openings 522*a*.

Referring to FIG. 2 and FIG. 9 to FIG. 14, a current tab member 7 is depicted. The current tab member 7 may include a terminal portion 71. The terminal portion 71 may be arranged at a center portion of the current tab member 7. The terminal portion 71 may be formed such that the terminal portion 71 can be inserted into the sealing opening 523. The terminal portion 71 may be formed such that the terminal portion 71 can protrude through the lid opening 513. The terminal portion 71 may have a height such that in an installed position, the terminal portion 71 protrudes from the lid member 51.

The current tab member 7 may include at least one contacting portion 72. The contacting portion 72 may extend in a radial direction. The contacting portion 72 may extend from the center portion of the current tab member 7.

The contacting portion 72 may include a tab welding portion 721. The tab welding portion 721 is configured for welding the current tab member 7 to the electrode assembly 3. The contacting portion 72 may include a tab welding groove 722. The tab welding groove 722 may have the tab welding portion 721 as its base. As specifically depicted in FIG. 11, the tab welding portion 721 is welded to the electrode assembly 3 via a tab weld seam 723.

Multiple configurations of tab weld seams 723 are possible. For example, the tab weld seam 723 may be formed by two separate weld seams that are arranged parallel to each other along the tab welding portion 721.

In another configuration, the tab weld seam 723 may be a continuous weld seam that is longer that the longitudinal dimension of the tab welding portion 721. For example, the tab weld seam 723 may start on the radial outside, move radially inward to the center portion, then change direction along the circumferential direction or a tangent to the circumferential direction and again move outwards from the center portion to the outer rim portion of the tab welding portion 721.

It is also possible to have the tab weld seam 723 configured in the opposite manner, i.e., the circumferential part or the tangential part are performed on the radial outward portion and not close to the center portion. It is also possible to combine these so as to form a rectangular tab weld seam 723.

In another configuration, the tab weld seam 723 can be zigzag configuration that alternates between both sidewalls of the tab welding groove 722. It should be noted that the straight line zigzag configuration is not the only possible embodiment; it is also possible to form the tab weld seam 723 in an alternating manner by making a sine curve or any other suitable continuous oscillating movement.

The current tab member 7 may include a heat sink portion 73. The heat sink portion 73 may be arranged at the center portion of the current tab member. The heat sink portion 73 is preferably disposed so as to support the terminal portion 71. In other words, the terminal portion 71 is adjacent to the heat sink portion 73 in the axial direction. The heat sink portion 73 has a larger thickness in the radial direction compared to the terminal portion 71.

The heat sink portion 73 may include a tapered heat sink portion 731. The tapered heat sink portion 731 is preferably cone-shaped. The tapered heat sink portion 731 has its smallest extension near the terminal portion 71 and expands in radial thickness downward in the axial direction.

The heat sink portion 73 may include a notch 732. The notch 732 may be formed with the tapered heat sink portion 731. The notch 732 may be formed such that the tap welding groove 722 can be extended closer to the center portion of the current tab member 7.

The heat sink portion 73 may include a plurality of thermal conductive leg portions 733. The thermal conductive leg portion 733 may extend from the tapered heat sink portion 731 preferably along the contacting portion 72. The thermal conductive leg portion 733 may form a sidewall of the tab welding groove 722. The thermal conductive leg portion 733 may have a much larger axial thickness (4 to 8 times) compared to the axial thickness of the tab welding portion 721.

Figure 15:
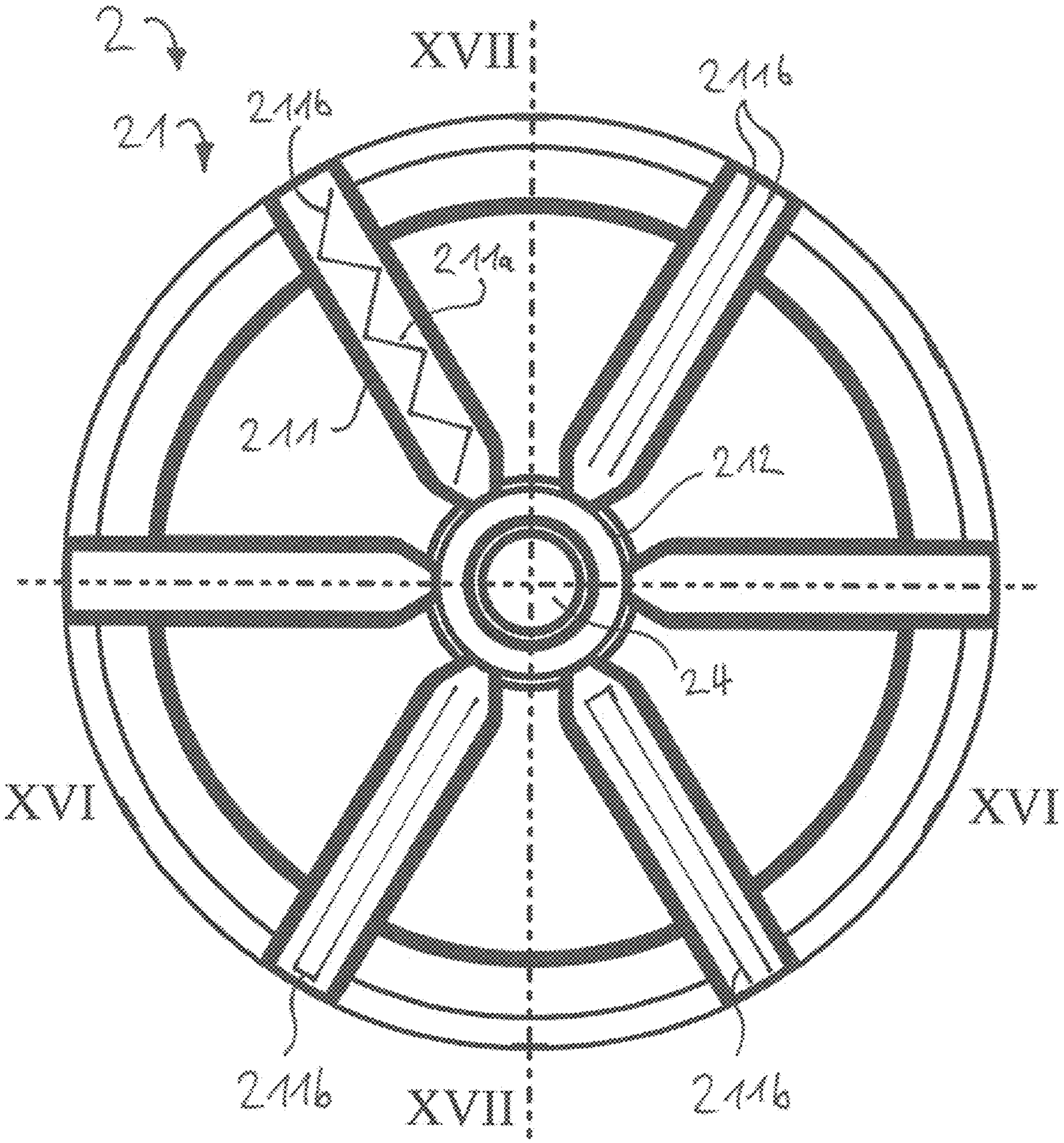
FIG. 15 depicts a bottom portion of the energy storage cell of FIG. 1.
Figure 16:
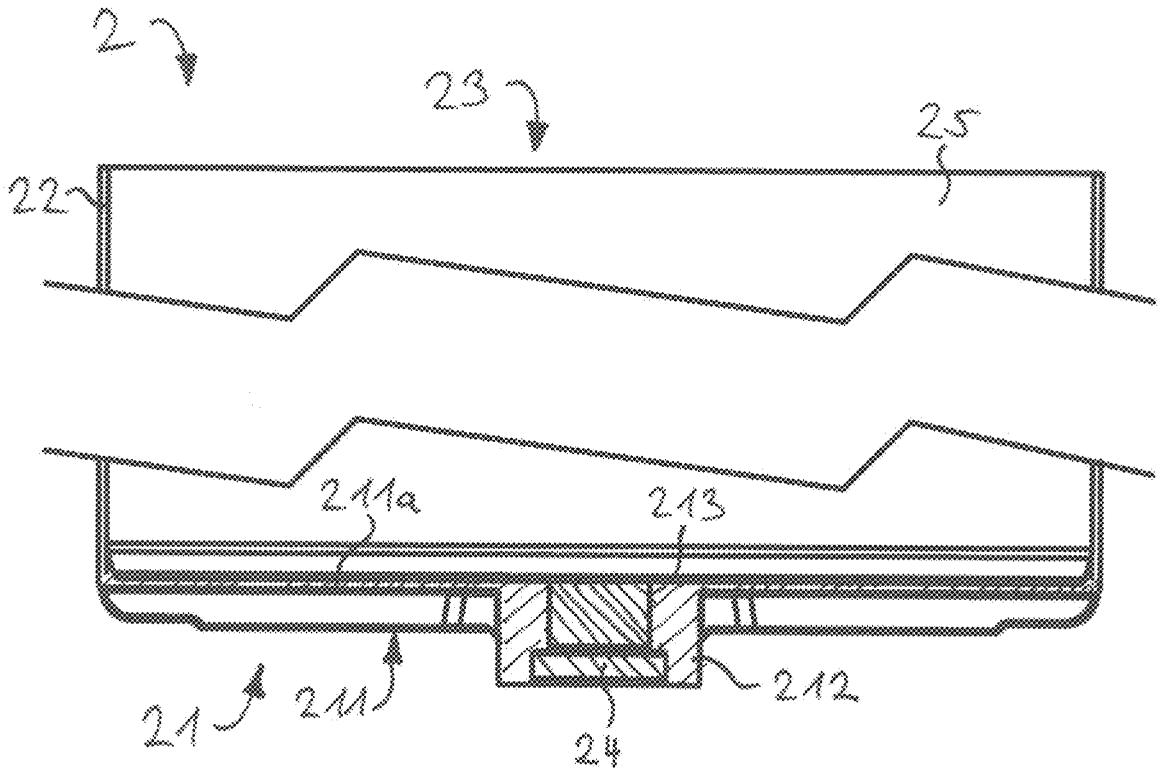
FIG. 16 depicts a cross-section of the bottom portion of FIG. 15 along line XVI-XVI.
Figure 17:
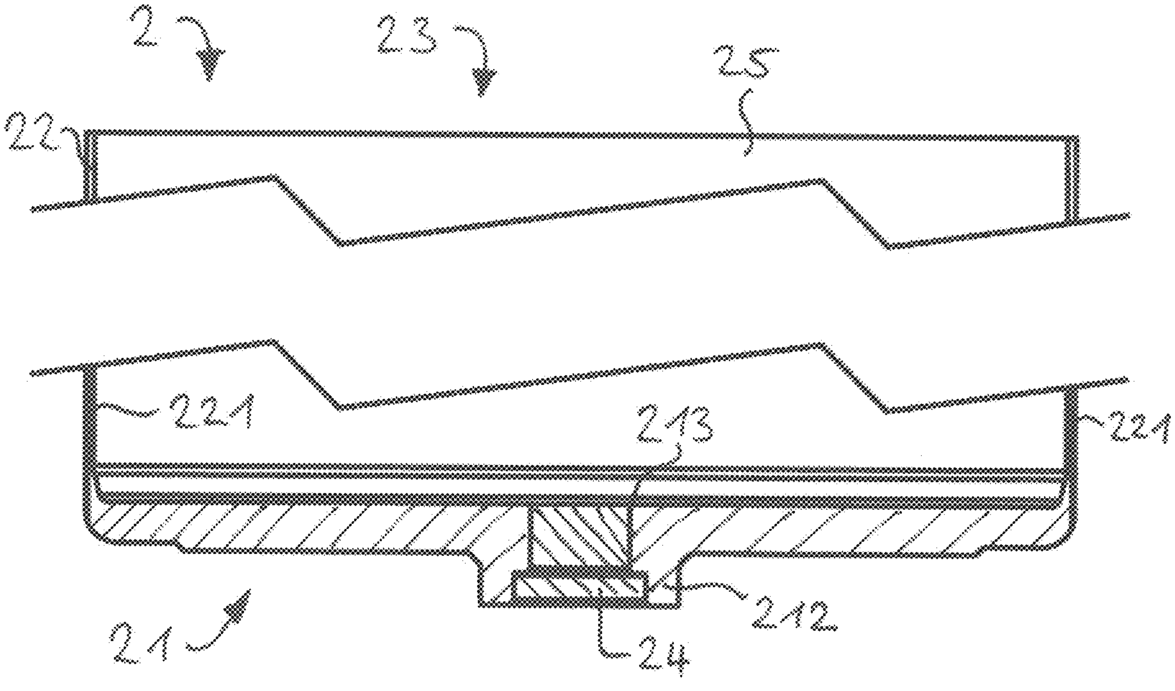
FIG. 17 depicts a cross-section of the bottom portion of FIG. 15 along line XVII-XVII.

Referring to FIG. 15 to FIG. 17, the bottom portion 21 is described in more detail. The plurality of exterior welding grooves 211 may extend from the central portion of the bottom portion 21 towards the periphery. The exterior welding groove 211 may comprise a plurality of bottom weld seams 211*b*. The bottom weld seam 211*b* may be formed on the welding groove base 211*a*.

Similar to the tab weld seam 723, the bottom weld seam 211*b* may be formed in two discontinuous parallel parts or a as continuous bottom weld seam 211*b* that is longer than the longitudinal dimension of the exterior welding groove 211.

In one example, the bottom weld seam 211*b* may start at the outer periphery and run substantially parallel to the exterior welding groove 211 and include a circumferential or tangential to the circumference part that is arranged close to the center portion and another part that extends from the center portion back towards the periphery.

In another example, the bottom weld seam 211*b* may begin at the center portion and extend substantially parallel to the exterior welding groove 211 followed by a circumferential or tangential to the circumference part that is arranged towards the outer rim and another part that extends from the outer rim back towards the center portion.

In another example, the bottom weld seam 211*b* extends in a zigzag formation along the exterior welding groove 211. The zigzag formation may be composed of a plurality of straight paths or a continuously oscillating path, such as a sinusoidal oscillation.

Figure 18:
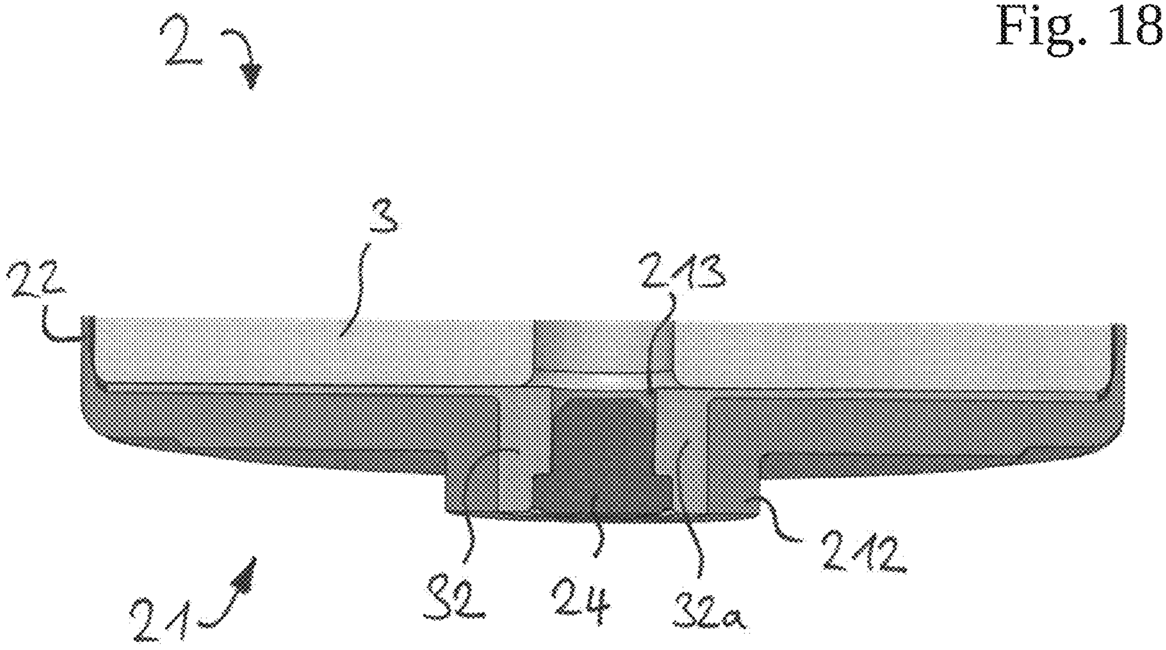
FIG. 18 depicts a cross-section of a variant of the bottom portion.

Referring to FIG. 18, a variant of the bottom portion 21 is depicted. In this example, the electrode assembly 3 comprises a bottom current tab member 32 which is fixed to the electrode assembly at an opposite side of the current tab member 7. The bottom current tab member 32 is substantially disk-shaped. The bottom current tab member 32 may include a bottom sleeve portion 32*a*. The bottom sleeve portion 32*a* may be formed on a center portion of the bottom current tab member 32. The bottom sleeve portion 32*a* is inserted into the bottom fluid passage 213. The bottom sleeve portion 32*a* still leaves the bottom fluid passage 213 available for a fluid connection. In other words, the bottom sleeve portion 32*a* defines an opening that is smaller but still part of the bottom fluid passage 213. In this variant, the plug member 24 is adapted to close the bottom fluid passage 213 by being welded to the bottom current tab member 32, preferably the bottom sleeve portion 32*a*.

Figure 19:
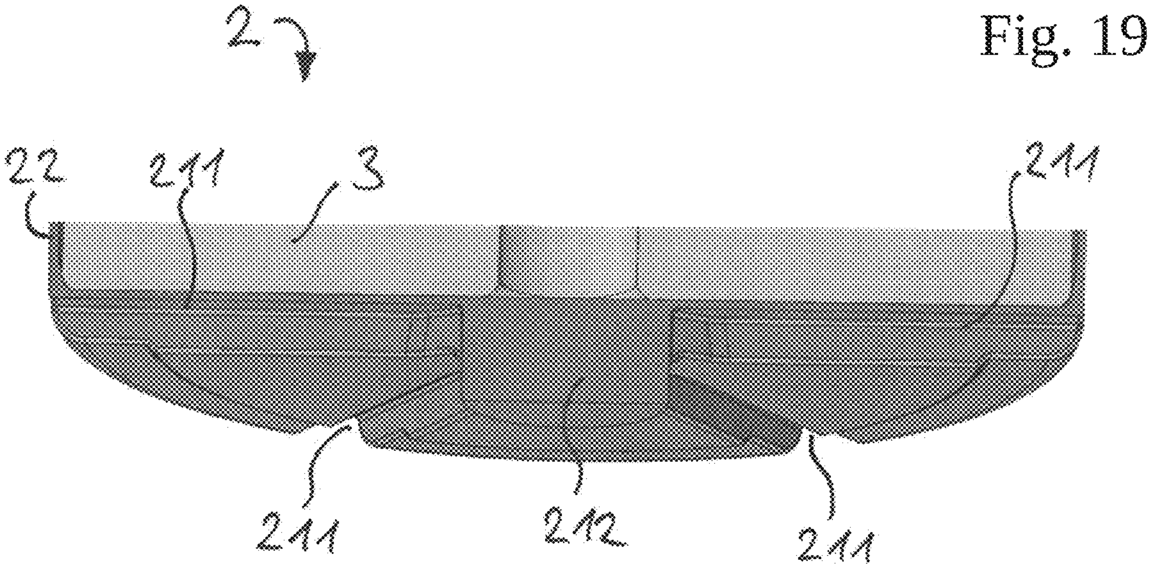
FIG. 19 depicts a cross-section of a variant of the bottom portion.

Referring to FIG. 19, another variant of the bottom portion 21 does not have any fluid passage that allows a fluid connection between the cell interior 25 and the outside of the cell body 2. In this configuration, the bottom protrusion 212 is a massive portion without discontinuities or openings.

In the following, an embodiment of a method for manufacturing the energy storage cell 1 is described in more detail.

Initially, a cell body 2 having at least the bottom portion 21, the wall portion 22 and the top opening 23 is provided. The electrode assembly 3 is inserted into the cell body 2 through the top opening 23. The electrode assembly 3 gets into contact with the bottom portion 21. The electrode assembly 3 is welded to the bottom portion 21 by laser welding or ultrasonic welding, for example. The respective laser beam or sonotrode is moved on the welding groove base 211*a* such that any of the previously described bottom weld seams 211*b* are formed. The electrode assembly 3 is in electrical contact with the bottom portion 21.

The cell body 2 and the electrode assembly 3 are brought to a filling station for the electrolyte 4. Therein, a vacuum, below 300 mb, preferably from 10 to 100 mb (rough vacuum) is applied. The electrolyte 4 is filled through the top opening 23 into the cell interior 25. The electrode assembly 3, as it is typically configured for supercapacitors, includes electrodes having a microporous (carbon) material. The electrolyte 4 adsorbs into the micropores, thereby generating adsorption heat which may heat the electrolyte 4 above boiling point. The electrolyte 4 may therefore be added not at once, but in several steps of adding some electrolyte 4, waiting for a predetermined amount of time and then again adding some electrolyte 4. It is also possible to cool the electrolyte 4 before filing. In another example, the cell body 2 is held in a heat sink member and/or actively cooled. Preferably, the cooling (either passively via heat sink or actively) is preferably dimensioned so as to prevent the electrolyte 4 from boiling and more preferably, from even reaching its flash point (if applicable).

After enough electrolyte 4 was added to the cell body 2, preferably still under the vacuum, the lid assembly 5 is inserted into the top opening 23. During insertion of the lid assembly 5, the sealing member 52, specifically the wiper portion 524, wipes any electrolyte from the wall portion 22 towards the bottom portion 21. As a result, the lid member 51, specifically the welding surface 515*b*, makes contact with a part of the wall portion 22 that has been cleaned from electrolyte 4 by the lid assembly 5.

During insertion of the lid assembly 5, the current tab member 7 comes into contact with the sealing member 52. Specifically, the terminal portion 71 may come into contact with the circumferential sidewall 523*a* and the sealing shroud 523*b*. The sealing shroud 523*b* electrically insulates the terminal portion 71 from the lid opening 513, specifically from the circumferential vertical wall 513*a*. The terminal portion 71 may exert a pressure onto the sealing shroud 523*b* and press it against the vertical sealing service 513*b* in order to form a seal.

Furthermore, the terminal portion 71 and/or the heat sink portion 73 may come into contact with the second bead sealing portion 523*e*. The second bead sealing portion 523*e* may be pressed against the current tab member in order to form a seal.

The heat sink portion 73 may come in contact with the sealing member 52. Specifically, the tapered heat sink portion 731 may come into contact with the tapered sealing portion 523*c*. The thermal conductive leg portion 733 may come into contact with the sealing base portion 522 and/or the second expansion chamber portion 521, e.g., the chamber bottom portion 521*a*. The fluid openings 522*a* and the contacting portions 72 are configured such that irrespective of the relative position of the current tab member 7 to the sealing member 52, an area equivalent to at least one fluid opening 522*a* allows a fluid connection between the cell interior 25 and the expansion chamber 6.

The expansion chamber 6 is formed by bringing the lid member 51 and the sealing member 52 into contact with each other. In this configuration, the first support protrusion 151*b* is accommodated in the first sealing groove 521*b*. Furthermore, the second support protrusion 511*c* may be accommodated in the second sealing groove 521*c*. As a result, the expansion chamber 6 is formed cooperatively by the lid member 51 and sealing member 52. The expansion chamber 6 may be defined by the chamber top portion 511*a*, the first support protrusion 511*b*, the first sealing groove

521*b*, the chamber bottom portion 521*a*, the second sealing groove 521*c* and the second support protrusion 511*c*. The expansion chamber 6 is formed such that the fluid opening 522*a* allows for fluid to be received from the cell interior or discharged from the expansion chamber 6 into the cell interior.

The lid assembly 5 is fixed to the cell body 2 by welding. Specifically, the lid member 51 may be welded to the wall portion 22 by laser welding. Preferably, the welding laser is directed parallel to the axial direction and onto the boundary between the welding surface 515*b* and an inner surface of the wall portion 22. With this, the cell body 2 is closed off by the lid assembly 5 against the environment and the energy storage cell 1 is completed. In contrast to the known manufacturing methods, the electrolyte 4 may be filled into the cell body 2 faster, even if the electrode assembly is already inserted into the cell body 2. In addition, fire hazards may be avoided, due to the electrolyte 4 being removed from close to the welding surfaces of the lid assembly 5 by the lid assembly itself. Overall, the handling of the electrolyte 4 is simplified and the overall time for manufacturing a single energy storage cell 1 may be reduced with the measures described above. In contrast to batteries, the microporous nature of the electrode assembly 3 or more specifically, the much larger amount of microporous material compared to regular secondary batteries, makes it much more difficult to introduce the electrolyte 4 at a high rate. With the previously described measures, the filling time for the electrolyte 4 may be substantially reduced.

Subsequently, another example for manufacturing the energy storage cell 1 is described in more detail.

Initially, a cell body is provided. The cell body includes at least the bottom portion 21, the wall portion 22 and the top opening 23. Furthermore, the bottom portion 21 includes the bottom fluid passage 213.

In a next step, the electrode assembly 3 is inserted into the cell interior 25 and welded to the bottom portion 21, as previously described. Furthermore, the lid assembly 5 is inserted into the top opening 23 to close off the cell interior 25 from the environment. The lid assembly 5 is welded to the cell body 2, specifically, to the wall portion 22, as previously described.

This results in a cell body 2 where the only opening left is the bottom fluid passage 213.

This arrangement is brought into a filling station, where a vacuum (as described above) is applied. The cell body 2 may be held in heat sink member and/or be actively cooled. Furthermore, the electrolyte 4 may be cooled before and/or during filling.

Subsequently, an injection member is inserted through the bottom fluid passage 213 and injects the electrolyte 4 into the cell interior. At the same time, the injection member may include a venting member that allows removal of vapors, gases, or other fluids from the cell interior. The electrolyte 4 is inserted so as to wet the electrode assembly 3. Finally, the injection member is removed and the plug member 24 is inserted into the bottom fluid passage 213. The plug member 24 is welded to the bottom portion 21, thereby closing off the cell interior 25 towards the bottom and completing the energy storage cell 1.

Similarly as before, during injection of the electrolyte 4, adsorption heat is generated. The heat is removed via cooling the cell body 2 using a heat sink and/or active cooling. Additionally or alternatively, the electrolyte itself may be cooled before injection. It is also possible to keep cooling the cell body and its contents after filling in order to ensure that the electrolyte 4 does not boil off.

In case boiling of the electrolyte 4 cannot be prevented, the vapors may rise inside the cell interior and expand into the expansion chamber 6. Thereby relieving pressure from the cell body and containing the electrolyte vapors inside the cell interior 25.

As a result, this type of cell may also be filled faster with electrolyte 4 compared to the known methods. In addition, the configuration ensures that, even if boiling of the electrolyte 4 cannot be prevented, the electrolyte 4 is still contained in the cell interior and the pressure relieved such that the cell body 2 is still sealed.

Subsequently, a functioning of the energy storage cell 1 during a failure, such as short-circuit or during high load is described in more detail.

When the energy storage cell 1 is heated during a high load cycle, the electrolyte 4 may partially transition into gas form. Sometimes, the electrolyte 4 is already above flash point temperature and may therefore generated explosive atmospheres. The electrolyte vapors can move from the electrode assembly 3 through the cell interior 25 and passing the current tab member 7 through the fluid opening 522*a* into the expansion chamber 6, where they can be easily contained. Thus, rise of a pressure of the cell interior 25 up to a point where the predetermined breaking portion 221 breaks, can be avoided.

In case of a short-circuit, a large amount of heat is generated within the cell interior 25. The electrolyte 4 behaves as previously described and may go into the expansion chamber 6, thereby avoiding a burst pressure of the predetermined breaking portion 221. In addition, the comparatively thick bottom portion 21 can act as a heat sink.

Also, due to the special configuration of the current tab member, heat generated in the electrode assembly is easily conducted by the thermal conductive leg portions 733 towards the tapered heat sink portion 731 and the adjacent terminal portion 71.

Simulations of the applicant show that in the short-circuit case, the highest thermal load in the energy storage cell is present on the current tab member 7 and the bottom portion 21, specifically, the bottom protrusion 212. Although a substantial amount of energy can be stored in the energy storage cell, the temperature of these portions does not exceed 100° C. Furthermore, the simulations show that the temperature in the largest portion of the cell interior is well below 50° C. and thus usually below the boiling point of the electrolyte 4. Consequently, the energy storage cell 1 as previously described is also more resilient against higher loads and short-circuits compared to conventional cells.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 energy storage cell
11 supercapacitor

2 cell body
21 bottom portion
211 exterior welding groove
211*a* welding groove base
211*b* bottom weld seam
212 bottom protrusion
213 bottom fluid passage
22 wall portion
221 predetermined breaking portion
23 top opening
24 plug member
25 cell interior
3 electrode assembly
31 insulating member
32 bottom current tab member
32*a* bottom sleeve portion
33 fixation member
4 electrolyte
5 lid assembly
51 lid member
511 first expansion chamber portion
511*a* chamber top portion
151*b* first support protrusion
511*c* second support protrusion
512 lid base portion
513 lid opening
513*a* circumferential vertical wall
513*b* vertical sealing surface
513*c* tapered circumferential wall
513*d* tapered sealing surface
514 reinforcement structure
514*a* rib
515 lid welding groove
515*a* groove sidewall
515*b* welding surface
52 sealing member
521 second expansion chamber portion
521*a* chamber bottom portion
521*b* first sealing groove
521*c* second sealing groove
522 sealing base portion
522*a* fluid opening
523 sealing opening
523*a* circumferential sidewall
523*b* sealing shroud
523*c* tapered sealing portion
523*d* bead sealing portion
523*e* second bead sealing portion
524 wiper portion
53 insulating part
6 expansion chamber
7 current tab member
71 terminal portion
72 contacting portion
721 tab welding portion
722 tab welding groove
723 tab weld seam
73 heat sink portion
731 tapered heat sink portion
732 notch
733 thermal conductive leg portion

The invention claimed is:

1. A lid assembly configured for closing a cell body of a supercapacitor, the cell body comprising a bottom portion, a wall portion, and a top opening, the lid assembly comprising:

an electrically conductive lid member and an electrically insulating sealing member, wherein the lid member and the sealing member are configured to cooperatively form an expansion chamber that is arranged between the lid member and the sealing member, wherein the lid member forms an expansion chamber top, and the sealing member forms an expansion chamber bottom, and wherein the expansion chamber is fluidly connectable to an interior of the cell body, such that the expansion chamber top and the expansion chamber bottom are in fluidic contact with the interior of the cell body.

2. The lid assembly according to claim 1, wherein the lid member and the sealing member are in mechanical contact with each other in order to form the expansion chamber.

3. The lid assembly according to claim 1, wherein the lid member comprises a first expansion chamber portion that includes a first support protrusion that protrudes towards the sealing member and contacts the sealing member, and wherein the first support protrusion is disposed on a circumferential rim portion of the lid member.

4. The lid assembly according to claim 1, wherein the lid member comprises a first expansion chamber portion that includes a second support protrusion that protrudes towards the sealing member and contacts the sealing member, and wherein the second support protrusion is disposed radially inward from a circumferential rim portion of the lid member.

5. The lid assembly according to claim 1, wherein the lid member comprises a lid opening and the lid opening includes at least one of a circumferential vertical wall or a tapered circumferential wall that widens in a direction towards the sealing member.

6. The lid assembly according to claim 1, wherein the lid member comprises at least one of a welding groove that is disposed on a circumferential rim portion of the lid member or a welding surface that is disposed on an outermost circumference of the lid member.

7. The lid assembly according to claim 1, wherein the lid member includes a lid opening, wherein the lid opening includes at least one of a vertical sealing surface that is disposed on a circumferential sidewall of the lid opening and that contacts the sealing member in order to form a seal or a tapered sealing surface that expands downward and that contacts the sealing member in order to form a seal.

8. The lid assembly according to claim 7, wherein the sealing member includes at least one of a sealing shroud that protrudes upward and contacts the vertical sealing surface to form the seal or a bead sealing portion that is disposed to be in contact with the tapered sealing surface to form the seal.

9. The lid assembly according to claim 1, wherein the sealing member comprises a second expansion chamber portion that includes a first sealing groove that is disposed on a circumferential rim portion of the sealing member, and the first sealing groove has inserted therein a portion of the lid member.

10. The lid assembly according to claim 1, wherein the sealing member comprises a second expansion chamber portion that includes a second sealing groove that is disposed radially inward from a circumferential rim portion of the sealing member, and the second sealing groove has inserted therein a portion of the lid member.

* * * * *